United States Patent
Ehrlich et al.

(10) Patent No.: US 11,977,455 B1
(45) Date of Patent: May 7, 2024

(54) BACK UP DATA ACROSS CLOUD TRUST ZONE APPARATUSES, PROCESSES AND SYSTEMS

(71) Applicant: Datto, Inc., Norwalk, CT (US)

(72) Inventors: Bryan Ehrlich, Norwalk, CT (US); Ben Lucas, Portland, OR (US); John Roland, Fairfield, CT (US)

(73) Assignee: DATTO, INC., Norwalk, CT (US)

( * ) Notice: Subject to any disclaimer, the term of this patent is extended or adjusted under 35 U.S.C. 154(b) by 183 days.

(21) Appl. No.: 17/750,279

(22) Filed: May 20, 2022

Related U.S. Application Data

(60) Provisional application No. 63/300,634, filed on Jan. 18, 2022.

(51) Int. Cl.
*G06F 11/14* (2006.01)
*G06F 9/455* (2018.01)

(52) U.S. Cl.
CPC ...... *G06F 11/1464* (2013.01); *G06F 9/45558* (2013.01); *G06F 11/1448* (2013.01); *G06F 2009/4557* (2013.01); *G06F 2009/45583* (2013.01)

(58) Field of Classification Search
CPC .............. G06F 11/1464; G06F 9/45558; G06F 11/1448; G06F 2009/4557; G06F 2009/45583
See application file for complete search history.

(56) References Cited

U.S. PATENT DOCUMENTS

| | | | |
|---|---|---|---|
| 2020/0250009 A1* | 8/2020 | Jaeger | H04L 63/20 |
| 2022/0027425 A1* | 1/2022 | Saksonov | G06Q 30/0251 |
| 2022/0028505 A1* | 1/2022 | Colburn | G06N 20/00 |
| 2022/0028538 A1* | 1/2022 | Auerbach | G16H 40/20 |
| 2022/0028548 A1* | 1/2022 | Colburn | G16H 50/20 |

* cited by examiner

*Primary Examiner* — Sean D Rossiter
(74) *Attorney, Agent, or Firm* — MASCHOFF BRENNAN

(57) ABSTRACT

The Back Up Data Across Cloud Trust Zone Apparatuses, Processes and Systems ("BUDACTZ") transforms resource backup registration input, resource backup execution request, resource restore input datastructure/inputs via BUDACTZ components into resource backup registration output, resource backup execution response, resource restore output outputs. A resource backup registration datastructure structured to specify a partner shared cloud protected zone is obtained. A partner zone administrator authorization token datastructure is obtained. A partner zone service account for the partner shared cloud protected zone is created using the partner zone administrator authorization token datastructure. A partner zone resource to be serviced is determined. A shared cloud backup zone is determined. A backup resource for the partner zone resource is created in the shared cloud backup zone. A service agent installation token datastructure structured to associate the partner zone resource and the backup resource is generated. A service agent is installed on the partner zone resource.

18 Claims, 14 Drawing Sheets

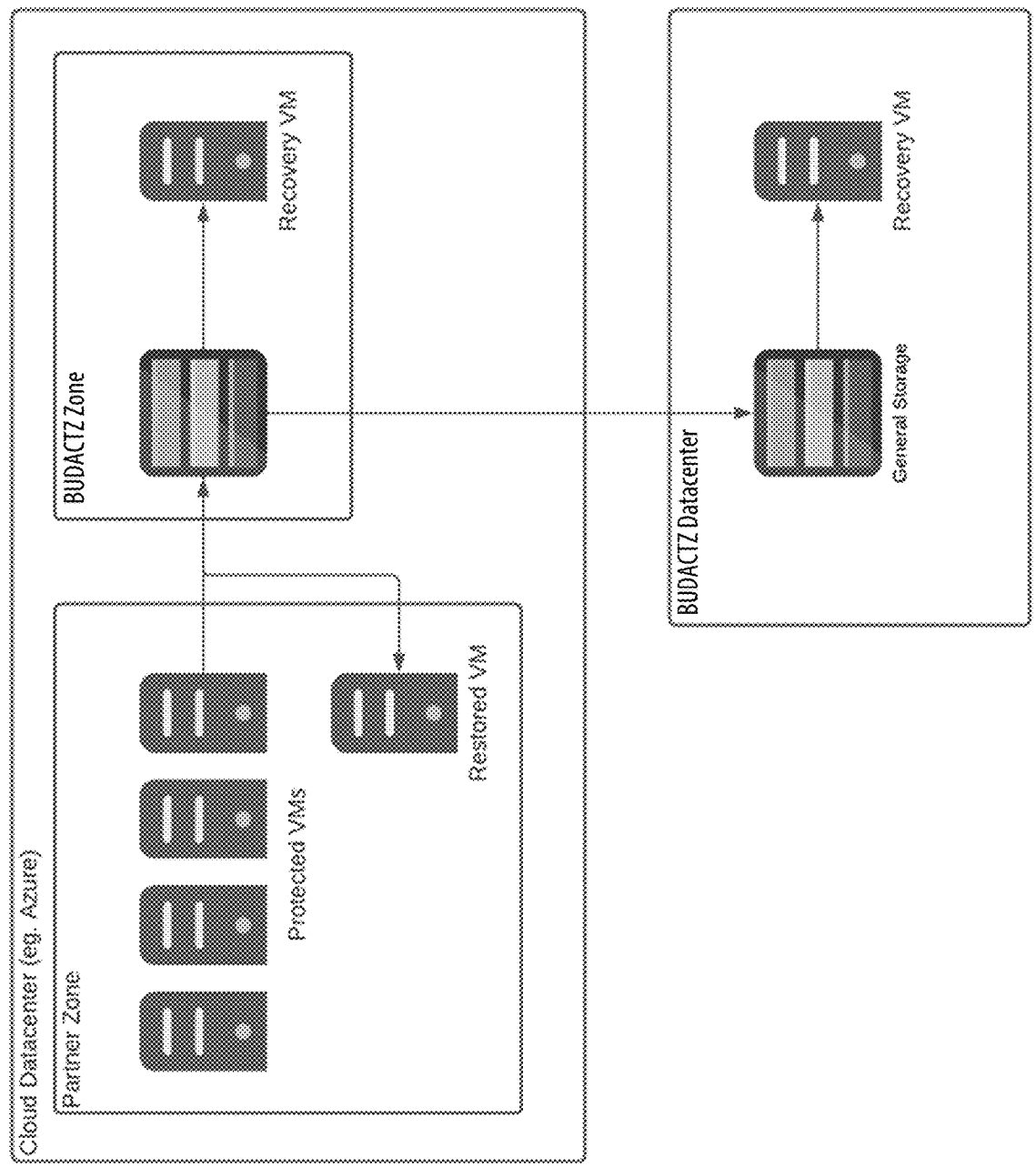
FIGURE 1: BUDACTZ ARCHITECTURE

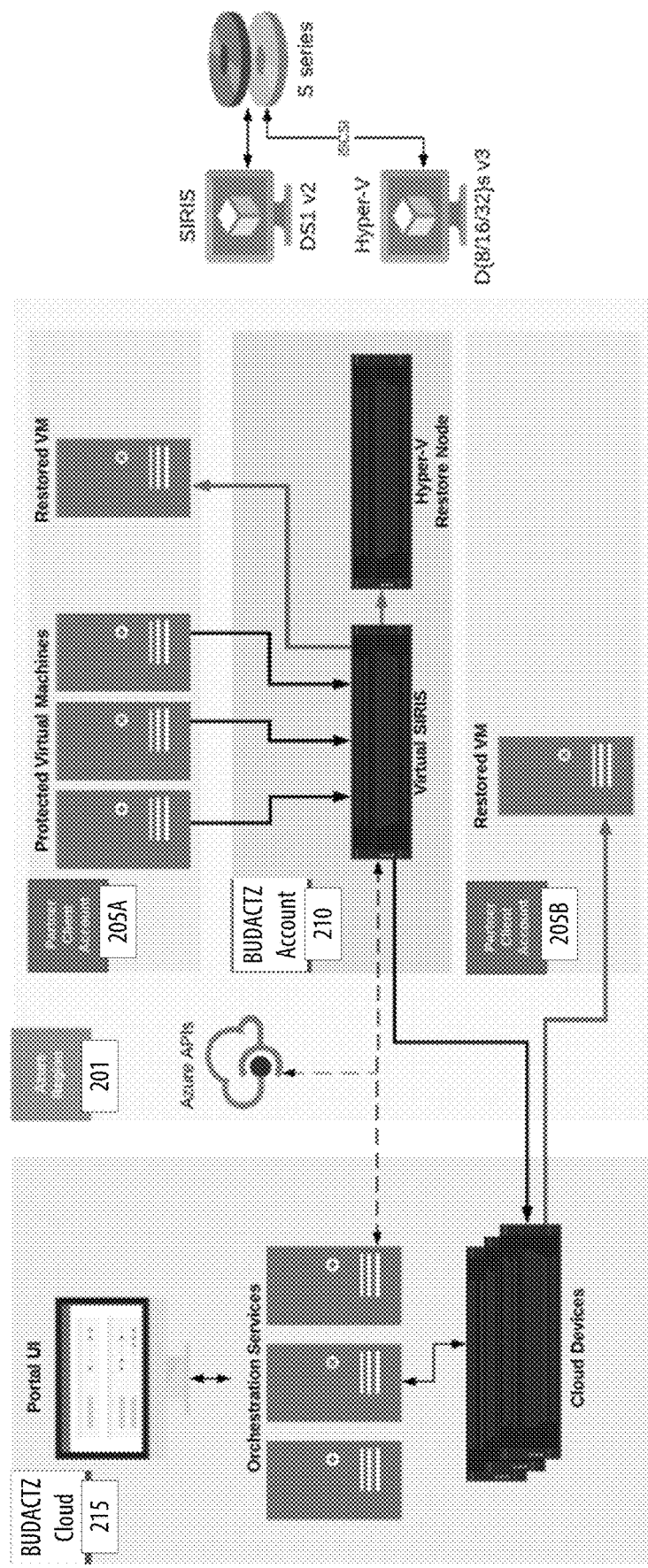
FIGURE 2: BUDACTZ ARCHITECTURE

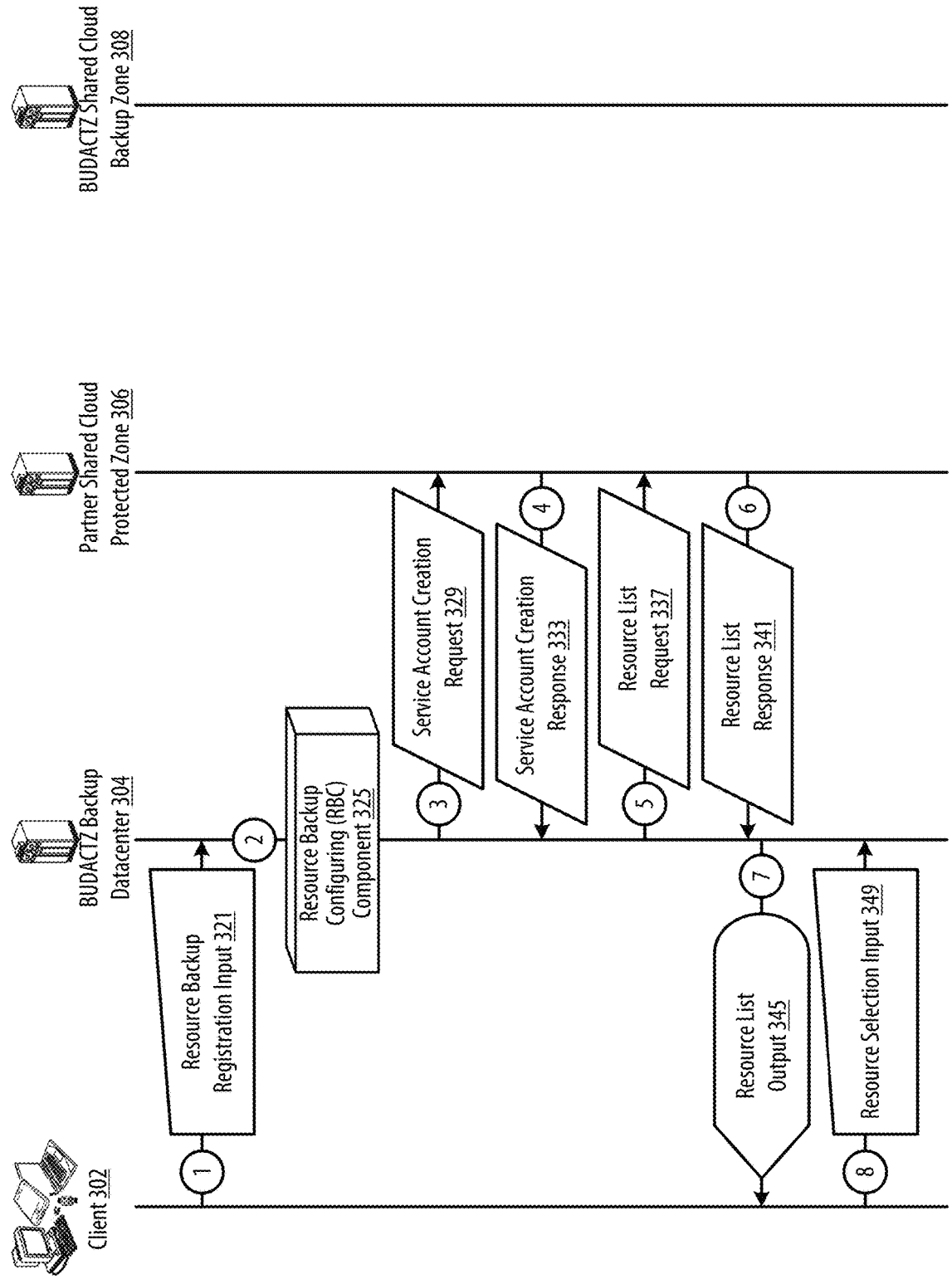

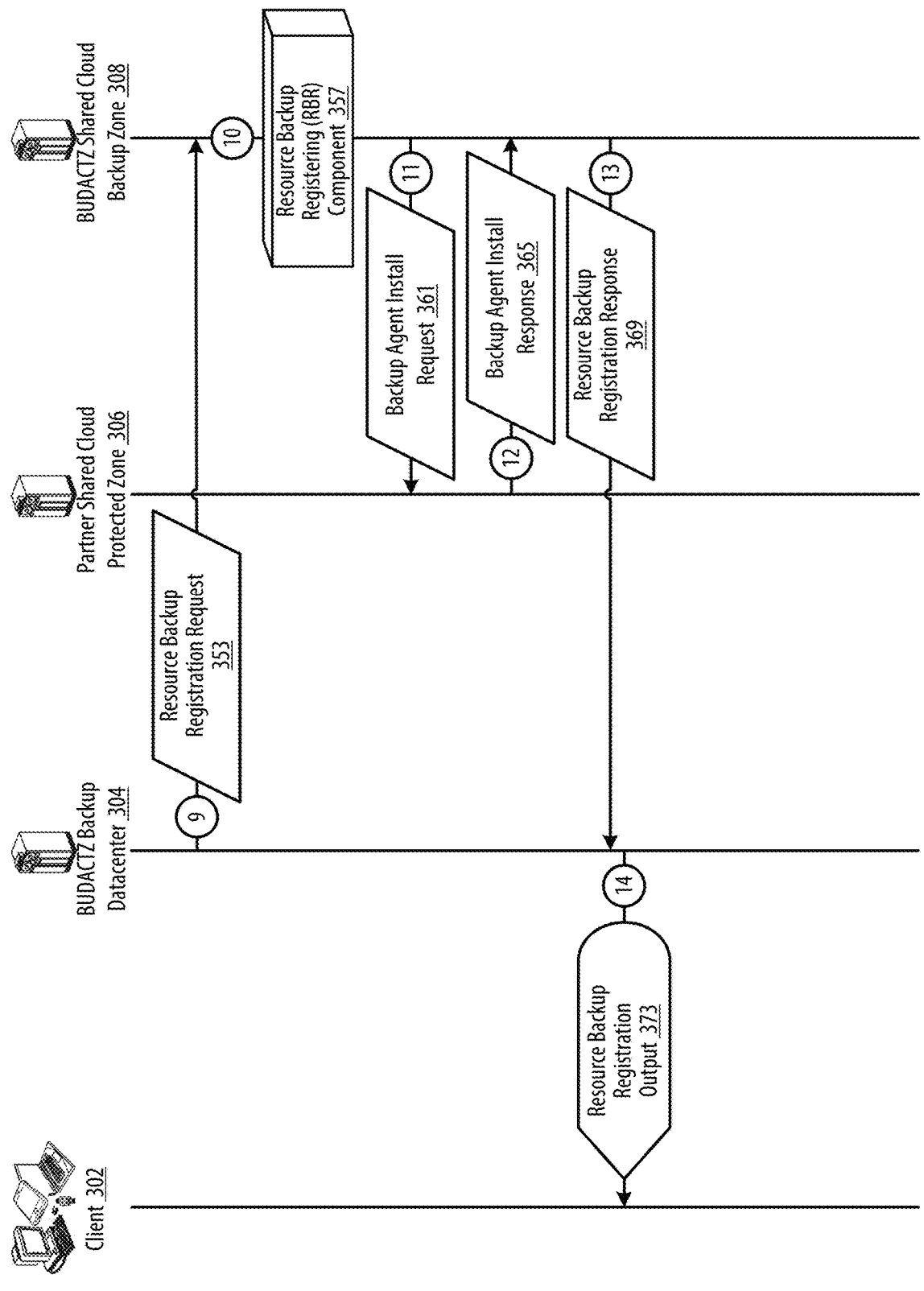
FIGURE 3B: BUDACTZ DATA FLOW

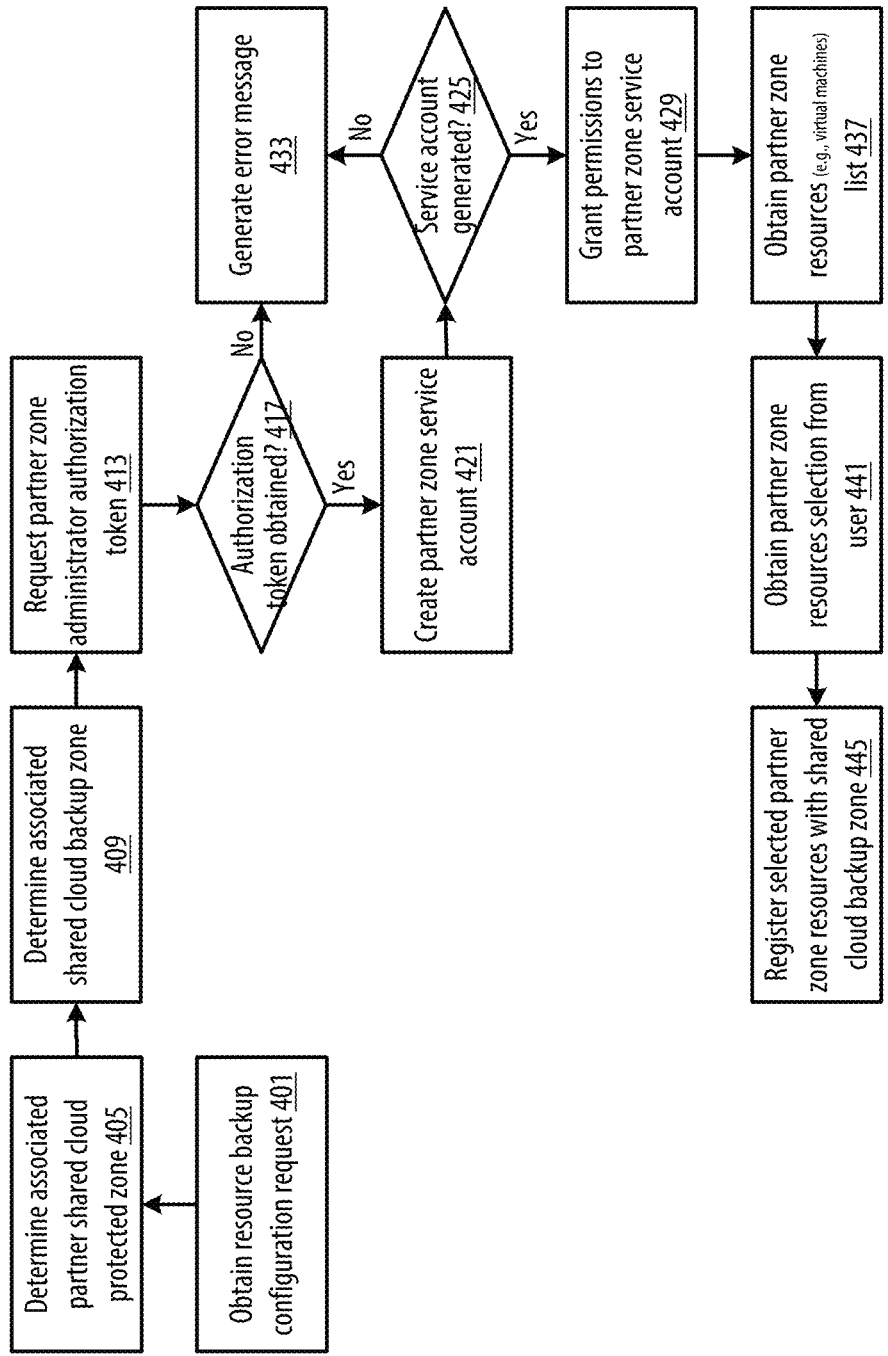

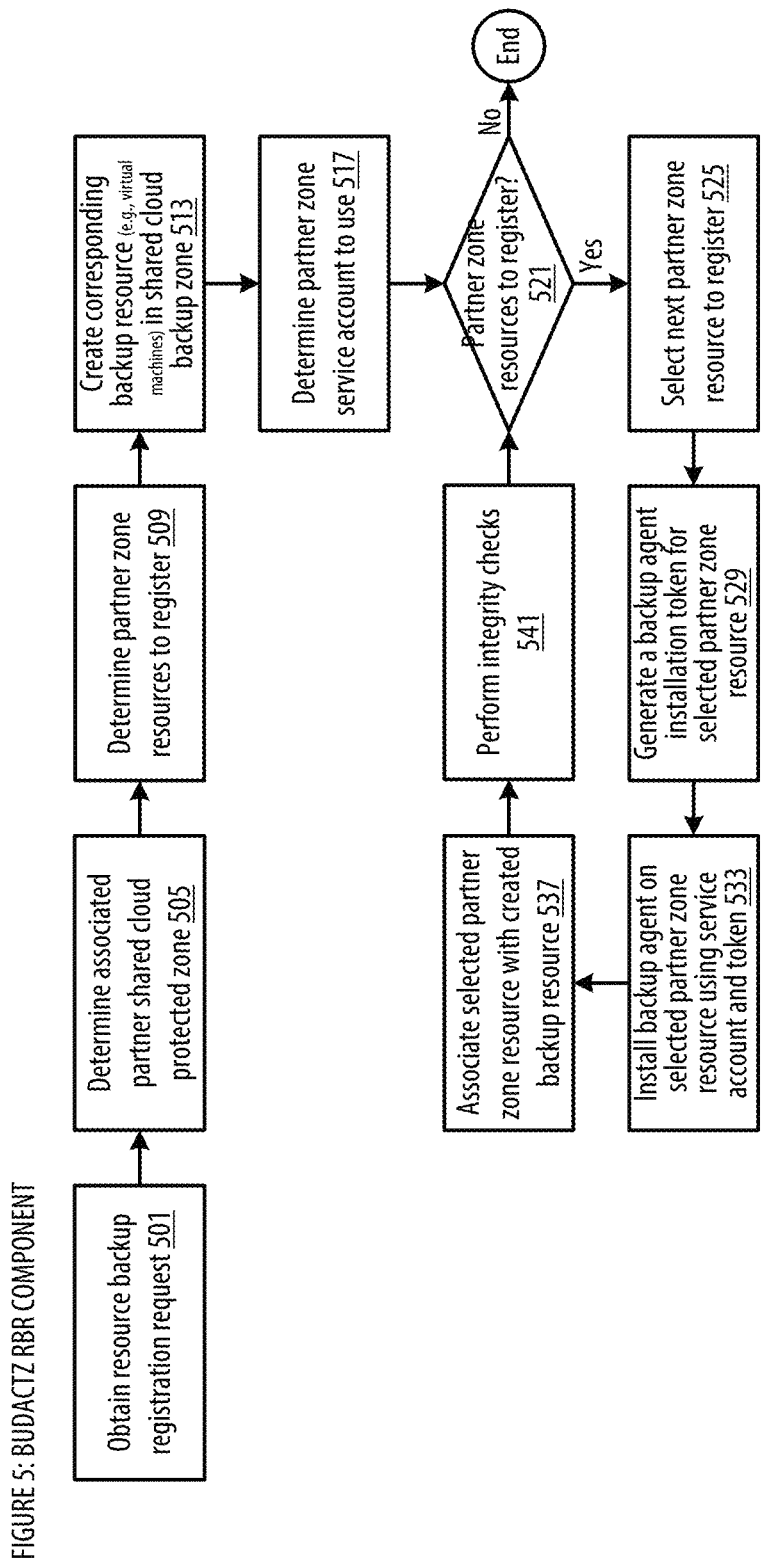

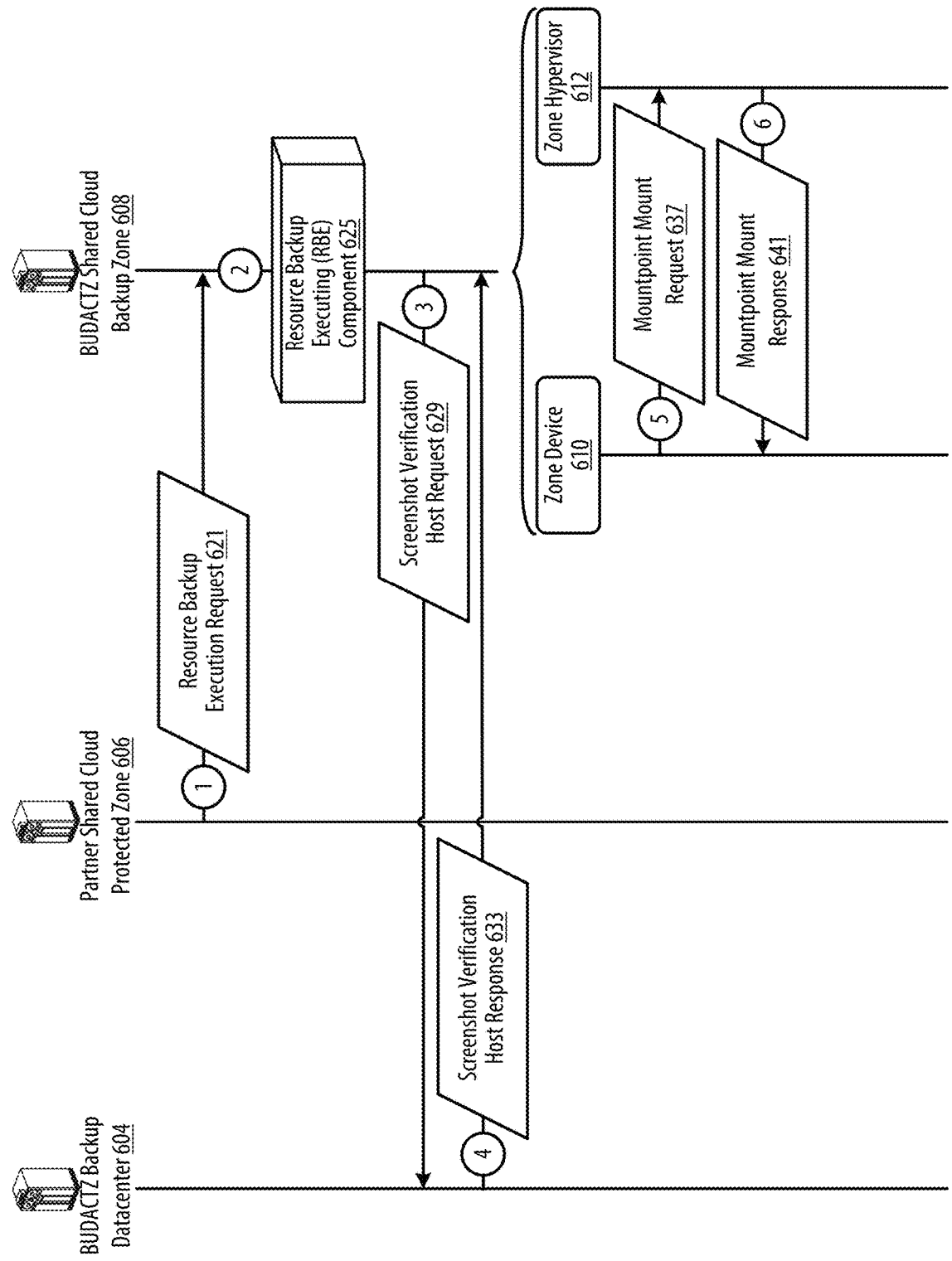
FIGURE 6A: BUDACTZ DATA FLOW

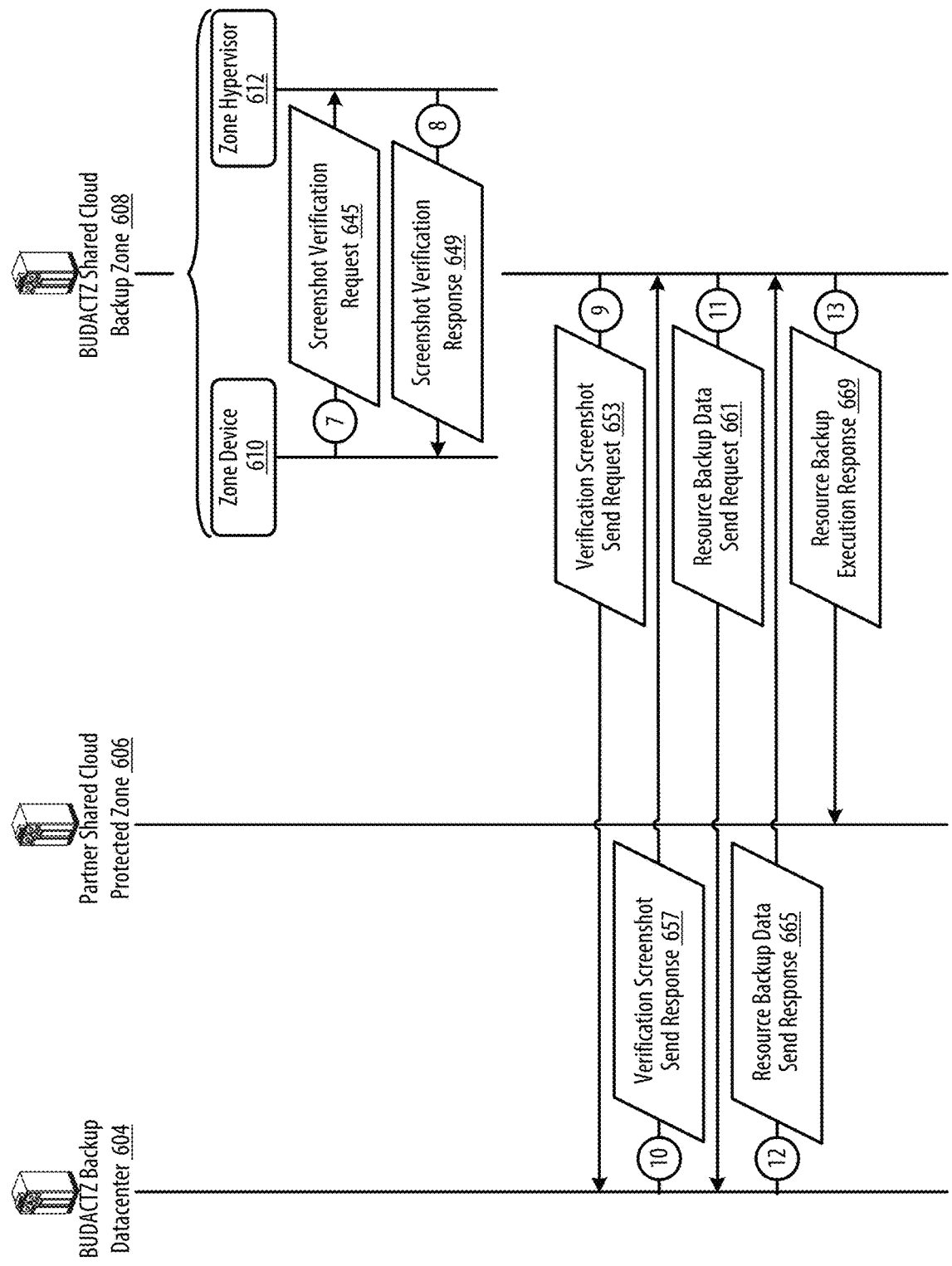
FIGURE 6B: BUDACTZ DATA FLOW

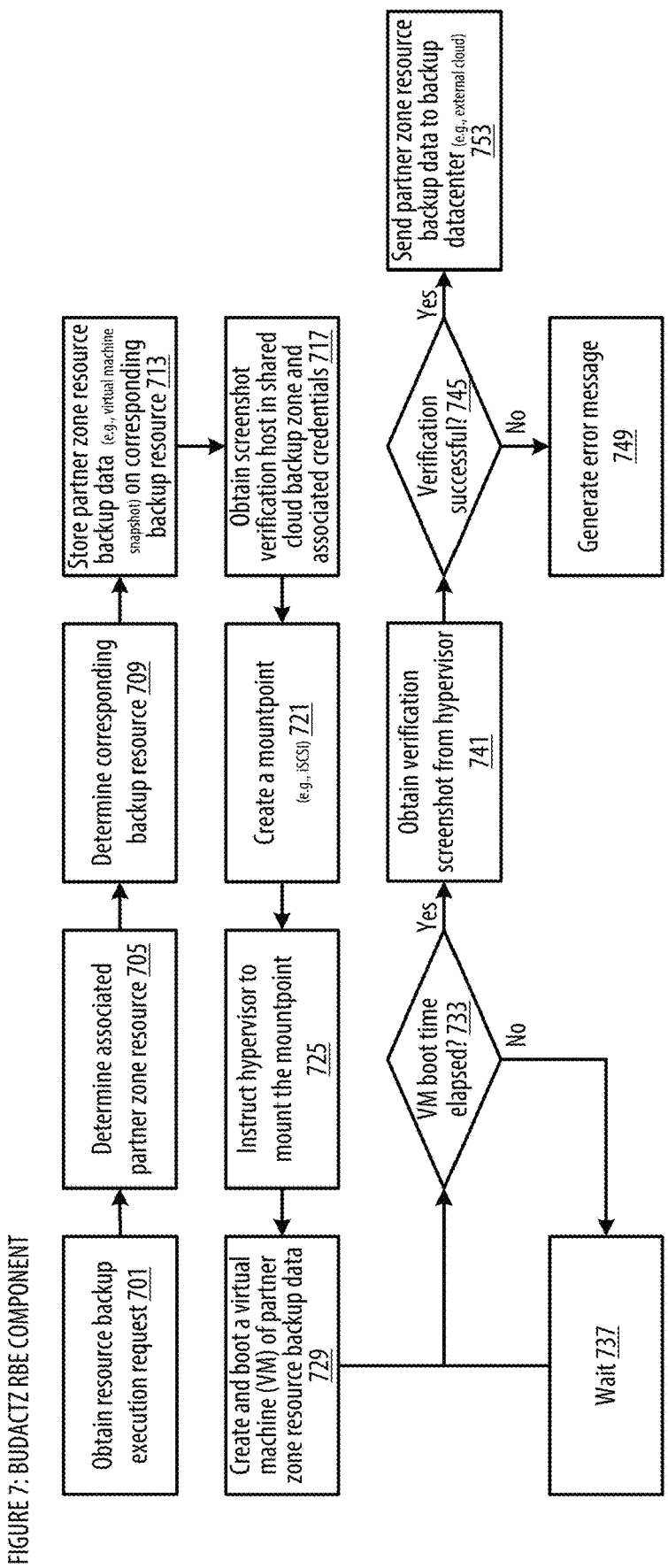

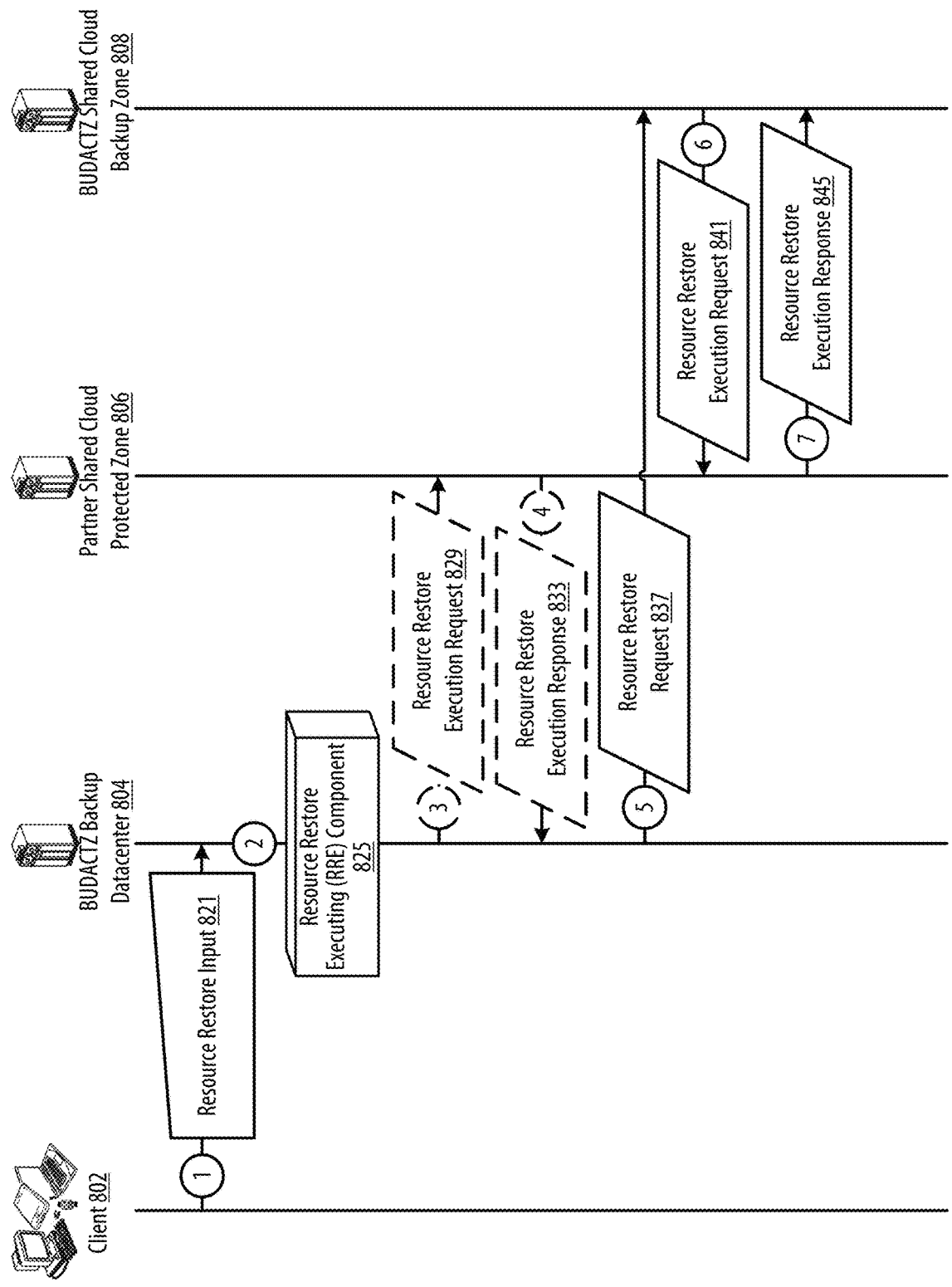

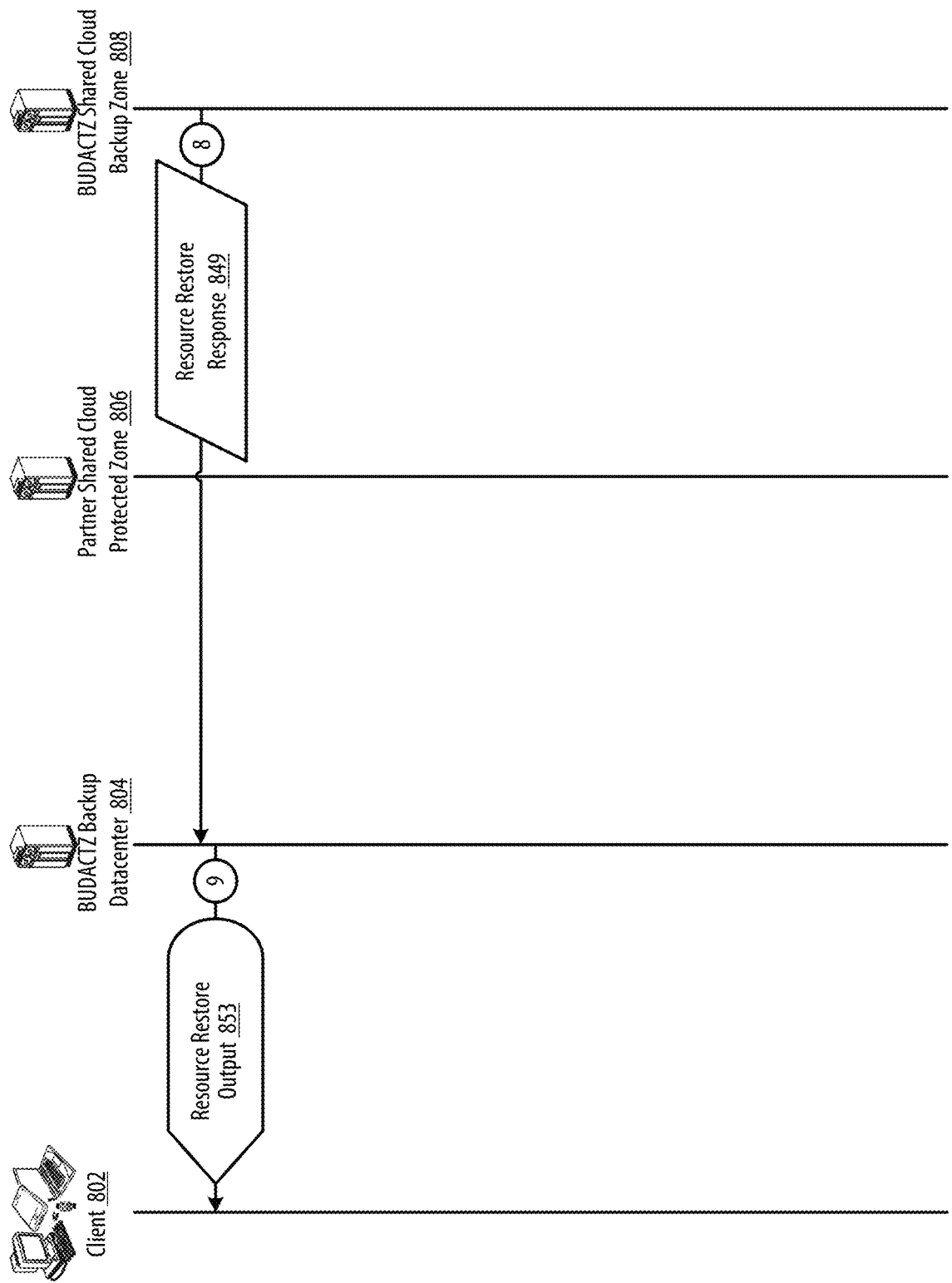
FIGURE 8B: BUDACTZ DATA FLOW

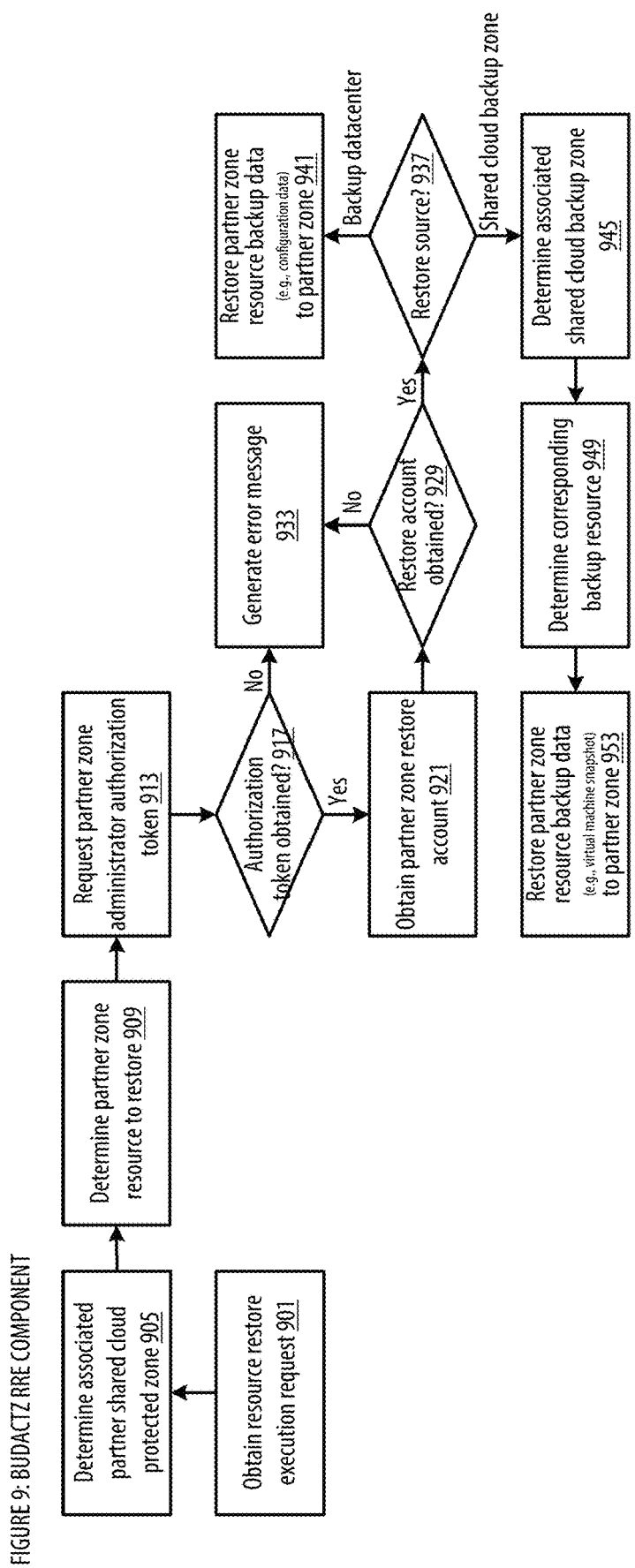

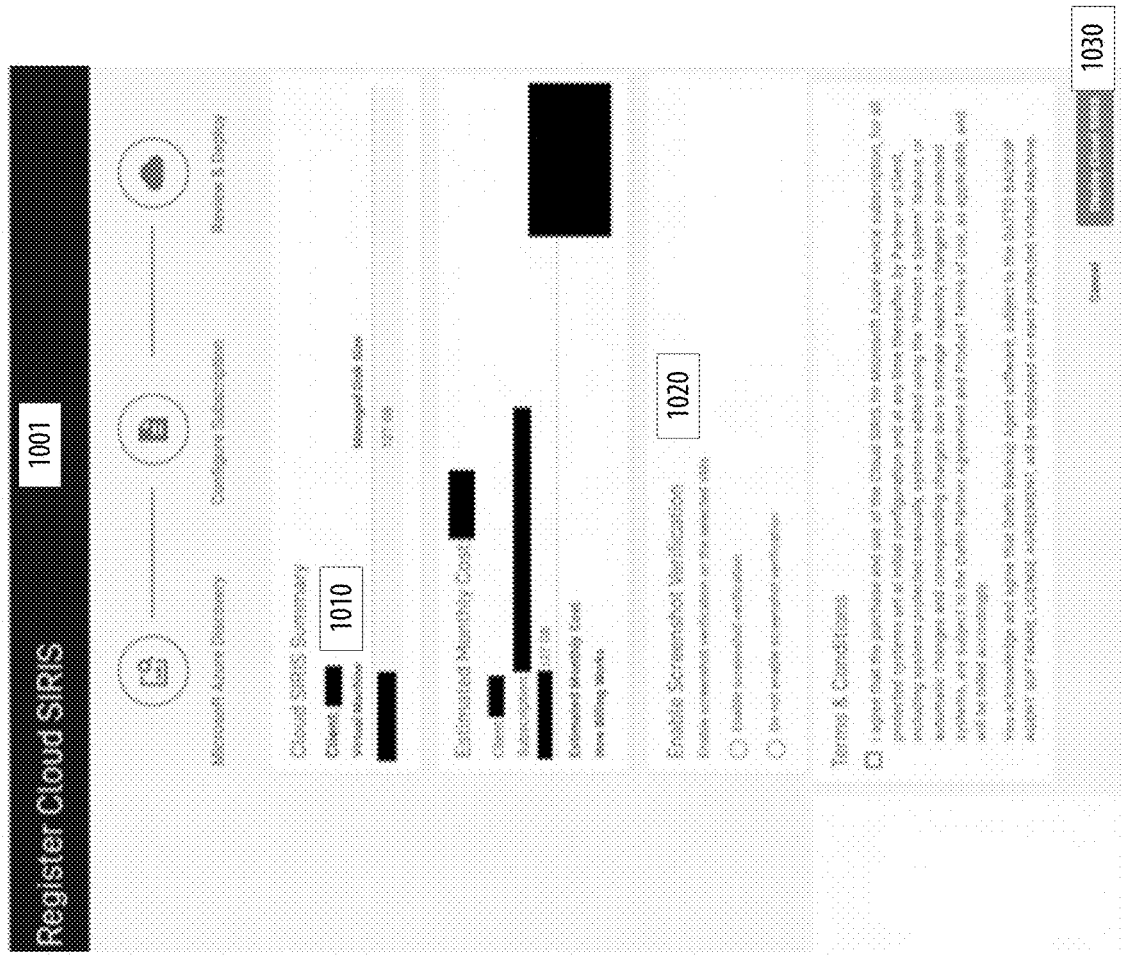
FIGURE 10: BUDACTZ SCREENSHOT

FIGURE 11: BUDACTZ Controller
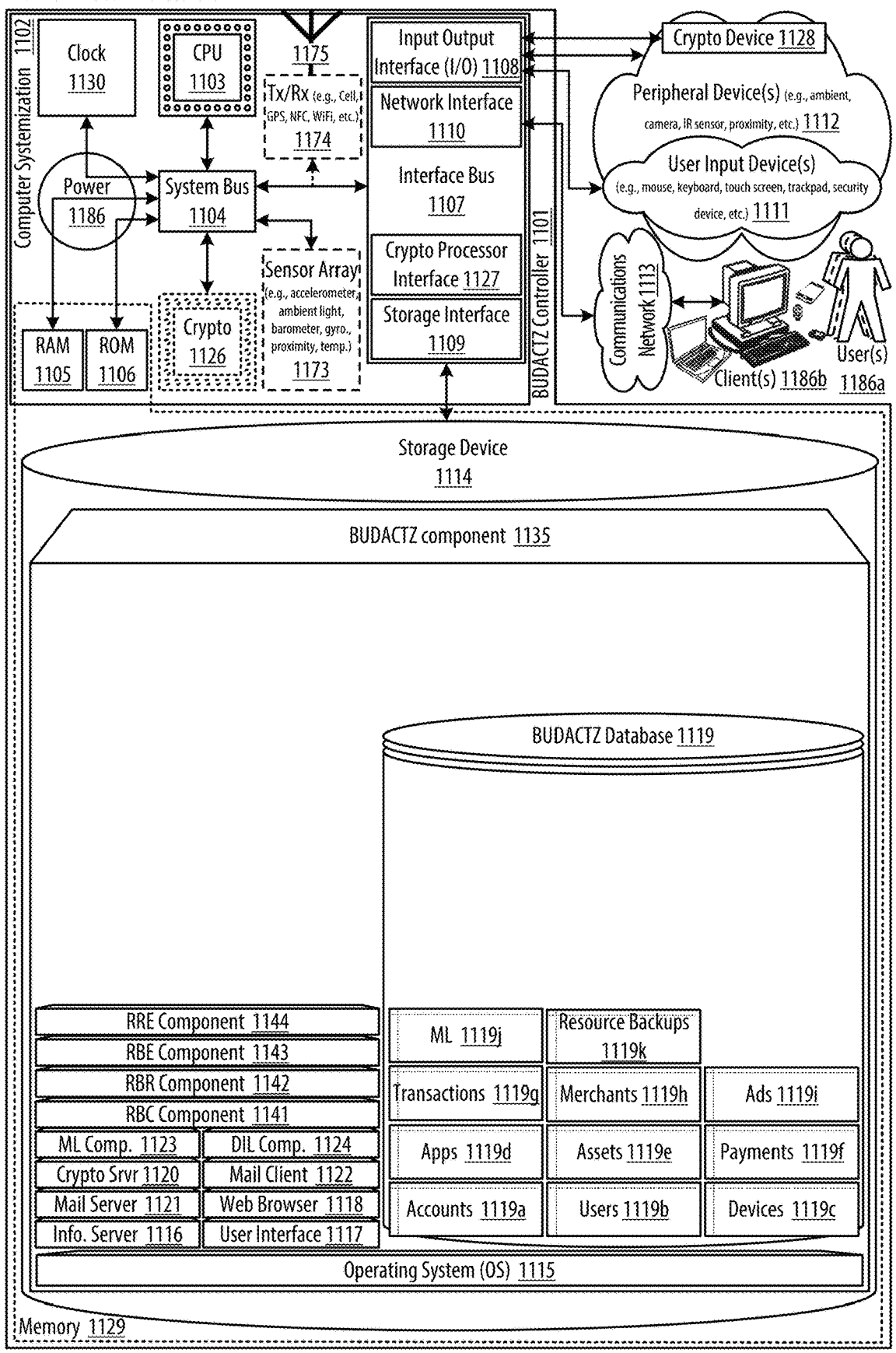

BACK UP DATA ACROSS CLOUD TRUST ZONE APPARATUSES, PROCESSES AND SYSTEMS

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

PRIORITY CLAIM

Applicant hereby claims benefit to priority under 35 USC § 119 as a non-provisional conversion of: U.S. provisional patent application Ser. No. 63/300,634, filed Jan. 18, 2022, entitled "Back Up Data Across Cloud Trust Zone Apparatuses, Processes and Systems".

The entire contents of the aforementioned applications are herein expressly incorporated by reference.

FIELD

The present innovations generally address backup systems, and more particularly, include Back Up Data Across Cloud Trust Zone Apparatuses, Processes and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Computer system backups are utilized to protect data from being lost due to equipment failures, malware and accidental deletions. A backup may involve copying files to be backed up from one location to another location. For example, files may be copied from a solid-state drive in a user's desktop to an external hard drive that may be connected to the user's desktop via USB.

BRIEF DESCRIPTION OF THE DRAWINGS

Appendices and/or drawings illustrating various, non-limiting, example, innovative aspects of the Back Up Data Across Cloud Trust Zone Apparatuses, Processes and Systems (hereinafter "BUDACTZ") disclosure, include:

FIG. 1 shows non-limiting, example embodiments of an architecture for the BUDACTZ;

FIG. 2 shows non-limiting, example embodiments of an architecture for the BUDACTZ;

FIGS. 3A-B show non-limiting, example embodiments of a datagraph illustrating data flow(s) for the BUDACTZ;

FIG. 4 shows non-limiting, example embodiments of a logic flow illustrating a resource backup configuring (RBC) component for the BUDACTZ;

FIG. 5 shows non-limiting, example embodiments of a logic flow illustrating a resource backup registering (RBR) component for the BUDACTZ;

FIGS. 6A-B show non-limiting, example embodiments of a datagraph illustrating data flow(s) for the BUDACTZ;

FIG. 7 shows non-limiting, example embodiments of a logic flow illustrating a resource backup executing (RBE) component for the BUDACTZ;

FIGS. 8A-B show non-limiting, example embodiments of a datagraph illustrating data flow(s) for the BUDACTZ;

FIG. 9 shows non-limiting, example embodiments of a logic flow illustrating a resource restore executing (RRE) component for the BUDACTZ;

FIG. 10 shows non-limiting, example embodiments of a screenshot illustrating user interface(s) of the BUDACTZ;

FIG. 11 shows a block diagram illustrating non-limiting, example embodiments of a BUDACTZ controller.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citations and/or reference numbers are not necessarily sequences but rather just example orders that may be rearranged and other orders are contemplated. Citation number suffixes may indicate that an earlier introduced item has been re-referenced in the context of a later figure and may indicate the same item, evolved/modified version of the earlier introduced item, etc., e.g., server 199 of FIG. 1 may be a similar server 299 of FIG. 2 in the same and/or new context.

DETAILED DESCRIPTION

The Back Up Data Across Cloud Trust Zone Apparatuses, Processes and Systems (hereinafter "BUDACTZ") transforms resource backup registration input, resource backup execution request, resource restore input datastructure/inputs, via BUDACTZ components (e.g., RBC, RBR, RBE, RRE, etc. components), into resource backup registration output, resource backup execution response, resource restore output outputs. The BUDACTZ components, in various embodiments, implement advantageous features as set forth below.

Introduction

The BUDACTZ provides unconventional features (e.g., obtain a backup service trust tone authorization token request datastructure; provide a trust zone service account creation request datastructure to a third-party service provider; provide a trust zone service account permissions grant datastructure to the third-party service provider for the created service account; provide a trust zone service account protected potential resource list datastructure to the third-party service provider for the created service account and granted account permissions; provide a trust zone service account storage creation request datastructure to the third-party service provider, subject to the permissions grant and potential resource list; provide a trust zone resource install agent to the third-party service provider for the created service account, granted account permissions, and created account storage; provide the resource install agent an instantiation instruction datastructure; obtain trust zone account storage backup data from the third-party service provider's instantiated resource install agent) that were never before available in backup systems.

The BUDACTZ addresses problems of security and cost employing highly efficient and never before existing mechanisms, including:

0022.1. If an attacker gains full control of "Partner Zone" they still don't have access to backups. Whereas other solutions (e.g., Azure backup) the attacker gains the ability to delete the backups.

0022.2. There is no cost for infrastructure or egress in the "Partner Zone"

0022.3. Restore into the "partner zone" from either the BUDACTZ subsystems (e.g., BUDACTZ Cloud or BUDACTZ Zone)

Public clouds may employ the concept of a "tenant" or "account", which the BUDACTZ may deploy its own mechanism as, and call, a "zone". These cloud zones may have several properties in common: 1) Isolation between zones for machines, users, and applications 2) Separate permissions for zones, i.e., zone1/user1 doesn't have access to the resources of zone2/user1 3) Separate billing for zones.

The BUDACTZ allows for data to be backed up across these cloud zones, e.g., as follows:

0024.1. Establish a trust relationship between zones*

0024.2. Automatically create a resource in the "BUDACTZ zone" (e.g., Datto zone) to accept backups 0024.3. Using the trust relationship established in #1 push a backup agent to 1 or more VMs in the "Partner zone"**

0024.4. Automatically begin backups from the "Partner zone" VMs to the resource created in #2

0024.5. Verify that the backup was successful using a screenshot verification in the "BUDACTZ zone" (e.g., Datto zone)***

0024.6. Egress the data from the "BUDACTZ zone" (e.g., Datto zone) to the "BUDACTZ cloud" (e.g., Datto cloud) (to an external cloud)

0024.7. * The BUDACTZ employs this account bootstrapping that uses novel mechanisms: Automatically obtain credentials for an Admin of "Partner Zone", these credentials are used to create a service credential in the "Partner Zone" and grant access to that service credential 0024.8. ** There's a lot going on behind the scenes here that is at least non-trivial: Push install with a unique token establishing the relationship between the backup resource and the agent, integrity checks to ensure that the established relationship between the backup resource and agent will not be cross-region (to avoid cost to the Partner zone)

0024.9. *** The screenshot verifications themselves are a BUDACTZ mechanism, and further employ a never before attempted mechanism that includes a fleet of multi-tenant machines used to perform these verifications In one alternative example embodiment, while likely infeasible to do this all manually, it would be possible, technical, BUDACTZ may provide a kind of credentialed endpoint in the "BUDACTZ Zone", send it to the Partner, the Partner could manually upload their data 24× a day. Then restores would be the opposite, the Partner would manually give the "BUDACTZ Zone" a credential to the "Partner Zone".

In one embodiment, the BUDACTZ "Cloud Trust Zone" includes:

0026.1. A partitioning of a public cloud into logically separate sub-units, with the following properties 0026.2. Each zone has separate accounts 0026.2.1. For example, cloud/zone1/user1 and cloud/zone2/user1 (same name is intentional) represent different users 0026.3. Each zone has separate resources and systems 0026.3.1. For example, cloud/zone1/vm1 and cloud/zone2/vm1 (same name is intentional) represent different virtual machines 0026.4. Sub-units do not share permissions 0026.4.1. For example: users/systems who can access zone1 will have no access to zone2

0026.5. Each zone's ownership and cost are separate

In one example embodiment, the BUDACTZ may be analogized to a physical world as separate office buildings. Each office building will have different security protocols, people who work in "Building A" have no access to "Building B". "Building A" can have an office called "office 1a", but that is not the same as "office 1a" in "Building B", those are separate resources in separate locations. Each building will have a separate owner, who pays the bills only for their building.

The BUDACTZ may include zones and centers referred to below and in the figures could be replaced by alternative mechanism:

0028.1. —Partner Zone, Protected Zone, IT Management Zone 0028.2. —BUDACTZ Zone (e.g., Datto Zone), Protection Zone, Backup Zone 0028.3. —BUDACTZ Data Center (e.g., Datto Data Center), Protection or Backup Data Center Backing Up Data Across Cloud Trust Zones The BUDACTZ, in one example, includes the following workflow. In this example, a "Partner Zone" may contain the data that someone desires to back up, and BUDACTZ Zone (e.g., Datto Zone) contains resources for facilitating backups. Additionally, this flow may refer to the "BUDACTZ (e.g., Datto) Cloud" which contains software to facilitate these inter-zone transfers.

Agent Installation+Backup 0030.1. Partner Zone user gives credentials to the BUDACTZ Cloud (e.g., Datto Cloud), to access resources in the Partner Zone 0030.2. The BUDACTZ Cloud (e.g., Datto Cloud) uses these credentials to display resources (e.g., Virtual Machines) to the Partner Zone user, giving the Partner Zone user an opportunity to select which resources they would like to back up 0030.3. [Purchase]

0030.4. Resources are automatically created in the BUDACTZ Zone (e.g., Datto Zone) (e.g., Virtual Machines) to house: backup data, and miscellaneous other information about the Partner Zone resources being backed up 0030.5. Agents are automatically installed in the Partner Zone, on the resources the partner selected 0030.6. Agents check into the BUDACTZ Cloud (e.g., Datto Cloud) using their Partner Zone address 0030.7. The BUDACTZ Cloud (e.g., Datto Cloud) associates these Partner Zone agents with the BUDACTZ Zone (e.g., Datto Zone) backup resource that was created 0030.8. Partner Zone resources begin sending data directly to BUDACTZ Zone (e.g., Datto Zone) resources, across the cloud trust zone security boundary Restore 0031.1. Essentially the above process, in reverse 0031.2. [Partner Zone resource is destroyed in a disaster]

0031.3. User from Partner Zone, logs into the BUDACTZ Cloud (e.g., Datto Cloud) with BUDACTZ Cloud (e.g., Datto Cloud) credentials 0031.4. User from Partner Zone requests a restore from the BUDACTZ Zone (e.g., Datto Zone), back to the Partner Zone 0031.5. The BUDACTZ Cloud (e.g., Datto Cloud) uses Partner Zone credentials to create two types of resources in the Partner Zone 0031.6. Some Partner Zone resources can be recreated directly from the BUDACTZ Cloud (e.g., Datto Cloud): e.g., configurations, virtual network cards with minimal configuration data 0031.7. Other Partner Zone resources are "hydrated" with data from the BUDACTZ Zone (e.g., Datto Zone): This is facilitated by issuing short lived credentials that are passed back to the BUDACTZ Zone (e.g., Datto Zone), for the purpose of copying data back to the Partner Zone 0031.8. Backups automatically resume from the newly created resource in the Partner Zone, back to the BUDACTZ Zone (e.g., Datto Zone)

In one embodiment, the channel is the traffic going Partner Zone=>BUDACTZ Zone (e.g., Datto Zone)=> Cloud. It is useful to look at all the elements together. For example, if traffic is sent via Partner Zone=>BUDACTZ Zone (e.g., Datto Zone), it may cost money to the owner of the Partner Zone. And the interesting part here, in one example, is that there is $0 cost to the Partner Zone. In another alternative embodiment, the BUDACTZ allows everyone else to spin up this infrastructure in the "Partner Zone" and sending direct to "Offsite Cloud"—for cost to the owner of Partner Zone.

In one example embodiment, the BUDACTZ includes hundreds of Partner Zones in each region. So, the BUDACTZ Zone (e.g., Datto Zone) is an aggregation point for the traffic. In such an example, the BUDACTZ may obtain bulk rates and/or dedicated physical networking hardware to connect BUDACTZ Zone (e.g., Datto Zone)<=>BUDACTZ DC (e.g., Datto DC). In one embodiment, the transfer protocol is mercuryftp, and some aspect of "sloppy copy" may be used.

In one example embodiment, the BUDACTZ mechanism for screenshot verification may include the following get screenshot host request and/or response:

Request: v1/device/asset/agent/screenshot/getHypervisorInfo

Response:
{
  "address": [ip address],
  "loginDomain": [Active directory domain, e.g., DATTO],
  "username": [User that has virtualization privs],
  "password": [Virt user's password]
}

BUDACTZ

FIG. 1 shows non-limiting, example embodiments of an architecture for the BUDACTZ. In FIG. 1, an embodiment of how data may be backed up across cloud trust zones is illustrated. A cloud datacenter 101 (e.g., Azure, or another shared cloud) may comprise a plurality of zones, such as a partner zone 105 and a backup zone 110. The partner zone may include a set of resources (e.g., protected virtual machines (VMs) that are backed up). The resources are backed up (e.g., periodically using a backup agent) to the backup zone and/or to a backup datacenter 115. To restore a resource in the partner zone, a recovery VM from the backup zone and/or a recovery VM from the backup datacenter may be utilized to recreate a restored VM in the protected zone.

FIG. 2 shows non-limiting, example embodiments of an architecture for the BUDACTZ. In FIG. 2, an embodiment of how data may be backed up across cloud trust zones is illustrated. A cloud region 201 (e.g., an Azure shared cloud region, or another shared cloud region) may comprise a plurality (e.g., hundreds) of zones, such as partner zones 205A-B and a backup zone 210. It is to be understood that cloud regions may be geographical, logical, organizational, and/or the like. It is to be understood that each partner may have one or more partner zones in the cloud region (e.g., partner zones 205A-B may be associated with the same partner or with two different partners). A partner zone may include a set of resources (e.g., protected VMs that are backed up). The resources are backed up (e.g., periodically using a backup agent) to the backup zone and/or to a backup datacenter 215 (e.g., an external cloud, such as a private cloud). In one embodiment, the resources are backed up to the backup zone, which conserves limited bandwidth available from a shared cloud provider by avoiding data egress from the cloud region. Because the resources are backed up to a different zone, if an attacker gains full control of a partner zone, the attacker still does not have access to or the ability to delete backups, resulting in a more robust and secure system. In another embodiment, the resources are also backed up to the backup datacenter, which provides an additional layer of protection. The backup zone may act as an accumulation point for the backup traffic of the plurality of zones in the cloud region to the backup datacenter, which improves speed and efficiency of operation (e.g., by providing dedicated physical networking hardware to connect the backup zone to the backup datacenter, which would be infeasible to provide for individual partner zones). To restore a resource in a partner zone, a recovery VM from the backup zone (e.g., Hyper-V restore node) and/or a recovery VM from the backup datacenter (e.g., a cloud device) may be utilized to recreate a restored VM in the protected zone.

FIGS. 3A-B show non-limiting, example embodiments of a datagraph illustrating data flow(s) for the BUDACTZ. In FIGS. 3A-B, a client 302 (e.g., of a user) may send a resource backup registration input 321 to a BUDACTZ backup datacenter 304 to facilitate registering a set of resources in a partner zone for backup protection. For example, the client may be a desktop, a laptop, a tablet, a smartphone, a smartwatch, and/or the like that is executing a client application. In one implementation, the resource backup registration input may include data such as a request identifier, a request type, a partner identifier, a partner zone administrator authorization token, a partner zone identifier, and/or the like. In one embodiment, the client may provide the following example resource backup registration input, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
```

```xml
<?XML version = "1.0" encoding = "UTF-8"?>
<auth_request>
  <timestamp>2020-12-31 23:59:59</timestamp>
  <user_accounts_details>
    <user_account_credentials>
      <user_name>JohnDaDoeDoeDoooe@gmail.com</user_name>
      <password>abc123</password>
      //OPTIONAL <cookie>cookieID</cookie>
      //OPTIONAL <digital_cert_link>www.mydigitalcertificate.com/
JohnDoeDaDoeDoe@gmail.com/mycertifcate.dc</digital_cert_link>
      //OPTIONAL <digital_certificate>_DATA _</digital_certificate>
    </user_account_credentials>
  </user_accounts_details>
  <client_details> //iOS Client with App and Webkit
      //it should be noted that although several client details
      //sections are provided to show example variants of client
      //sources, further messages will include only on to save
      //space
    <client_IP>10.0.0.123</client_IP>
    <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
    <client_product_type>iPhone6,1</client_product_type>
    <client_serial_number>DNXXX1X1XXXX</client_serial_number>
    <client_UDID>3XXXXXXXXXXXXXXXXXXXXXXXXD</client_UDID>
    <client_OS>iOS</client_OS>
    <client_OS_version>7.1.1</client_OS_version>
    <client_app_type>app with webkit</client_app_type>
    <app_installed_flag>true</app_installed_flag>
    <app_name>BUDACTZ.app</app_name>
    <app_version>1.0 </app_version>
    <app_webkit_name>Mobile Safari</client_webkit_name>
    <client_version>537.51.2</client_version>
  </client_details>
  <client_details> //iOS Client with Webbrowser
    <client_IP>10.0.0.123</client_IP>
    <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
    <client_product_type>iPhone6,1</client_product_type>
    <client_serial_number>DNXXX1X1XXXX</client_serial_number>
    <client_UDID>3XXXXXXXXXXXXXXXXXXXXXXXXD</client_UDID>
    <client_OS>iOS</client_OS>
    <client_OS_version>7.1.1</client_OS_version>
    <client_app_type>web browser</client_app_type>
    <client_name>Mobile Safari</client_name>
    <client_version>9537.53</client_version>
  </client_details>
  <client_details> //Android Client with Webbrowser
    <client_IP>10.0.0.123</client_IP>
    <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
    <client_product_type>Nexus S</client_product_type>
    <client_serial_number>YXXXXXXXXZ</client_serial_number>
    <client_UDID>FXXXXXXXXX-XXXX-XXXX-XXXX-XXXXXXXXXXXX</client_UDID>
    <client_OS>Android</client_OS>
    <client_OS_version>4.0.4</client_OS_version>
    <client_app_type>web browser</client_app_type>
    <client_name>Mobile Safari</client_name>
    <client_version>534.30</client_version>
  </client_details>
  <client_details> //Mac Desktop with Webbrowser
    <client_IP>10.0.0.123</client_IP>
    <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
    <client_product_type>MacPro5,1</client_product_type>
    <client_serial_number>YXXXXXXXXZ</client_serial_number>
    <client_UDID>FXXXXXXXXX-XXXX-XXXX-XXXX-XXXXXXXXXXXX</client_UDID>
    <client_OS>Mac OS X</client_OS>
    <client_OS_version>10.9.3</client_OS_version>
    <client_app_type>web browser</client_app_type>
    <client_name>Mobile Safari</client_name>
    <client_version>537.75.14</client_version>
  </client_details>
  <resource_backup_registration_input>
    <request_identifier>ID_request_1</request_identifier>
    <request_type>REGISTER_RESOURCES</request_type>
```

```
    <partner_identifier>ID_partner_1</partner_identifier>
    <partner_zone_token>administrator authorization token</partner_zone_token>
    <partner_zone_identifier>ID_PartnerZone_1</partner_zone_identifier>
  </resource_backup_registration_input>
</auth_request>
```

A resource backup configuring (RBC) component 325 may utilize data provided in the resource backup registration input to determine partner zone resources to register and/or to facilitate the registration of these resources. See FIG. 4 for additional details regarding the RBC component.

The BUDACTZ backup datacenter 304 may send a service account creation request 329 to a partner shared cloud protected zone 306 to facilitate creation of a service account in the partner shared cloud protected zone. In one implementation, the service account creation request may include data such as a request identifier, a request type, a partner zone administrator authorization token, a partner zone identifier, partner zone service account details, and/or the like. In one embodiment, the BUDACTZ backup datacenter may provide the following example service account creation request, substantially in the form of a HTTP(S) POST message including XML-formatted data, as provided below:

```
POST /service_account_creation_request.php HTTP/1.1
Host: www.server.com
Content-Type: Application/XML
Content-Length: 667
<?XML version="1.8" encoding="UTF-8"?>
<service_account_creation_request>
    <request_identifier>ID_request_2</request_identifier>
    <request_type>CREATE_SERVICE_ACCOUNT</request_type>
    <partner_zone_token>admistrator authorization token</partner_zone_token>
    <partner_zone_identifier>ID_PartnerZone_1</partner_zone_identifier>
    <service_account_details>
        <username>backup_service_name</username>
        <password>backup_service_password</password>
        <permissions>install backup agent, run backup agent, read data</permissions>
    </service_account_details>
</service_account_creation_request>
```

The partner shared cloud protected zone 306 may send a service account creation response 333 to the BUDACTZ backup datacenter 304 to confirm whether the partner zone service account was created successfully. In one implementation, the service account creation response may include data such as a response identifier, a status, and/or the like. In one embodiment, the partner shared cloud protected zone may provide the following example service account creation response, substantially in the form of a HTTP(S) POST message including XML-formatted data, as provided below:

```
POST /service_account_creation_response.php HTTP/1.1
Host: www.server.com
Content-Type: Application/XML
Content-Length: 667
<?XML version="1.8" encoding="UTF-8"?>
<service_account_creation_response>
    <response_identifier>ID_response_2</response_identifier>
    <status>OK</status>
</service_account_creation_response>
```

The BUDACTZ backup datacenter 304 may send a resource list request 337 to the partner shared cloud protected zone 306 to facilitate determining partner zone resources in the partner shared cloud protected zone that may be backed up. In one implementation, the resource list request may include data such as a request identifier, a request type, a partner zone administrator authorization token, a partner zone identifier, a resource filter, and/or the like. In one embodiment, the BUDACTZ backup datacenter may provide the following example resource list request, substantially in the form of a HTTP(S) POST message including XML-formatted data, as provided below:

```
POST /resource_list_request.php HTTP/1.1
Host: www.server.com
Content-Type: Application/XML
Content-Length: 667
<?XML version="1.8" encoding="UTF-8"?>
<resource_list_request>
    <request_identifier>ID_request_3</request_identifier>
    <request_type>LIST_RESOURCES</request_type>
    <partner_zone_token>admistrator authorization token</partner_zone_token>
    <partner_zone_identifier>ID_PartnerZone_1</partner_zone_identifier>
    <resource_filter>ALL_VIRTUAL_MACHINES</resource_filter>
</resource_list_request>
```

The partner shared cloud protected zone 306 may send a resource list response 341 to the BUDACTZ backup datacenter 304 with the requested resource list. In one implementation, the resource list response may include data such as a response identifier, the requested resource list, and/or the like. In one embodiment, the partner shared cloud protected zone may provide the following example resource list response, substantially in the form of a HTTP(S) POST message including XML-formatted data, as provided below:

```
POST /resource_list_response.php HTTP/1.1
Host: www.server.com
Content-Type: Application/XML
Content-Length: 667
<?XML version = "1.0" encoding = "UTF-8"?>
<resource_list_response>
    <response_identifier>ID_response_3</response_identifier>
    <resource_list>
        <virtual_machine>
            <ID>ID_resource_1</ID>
            <location>resource Location 1</location>
            <name>resource name 1</name>
            ...
        </virtual_machine>
        <virtual_machine>
            <ID>ID_resource_2</ID>
            <location>resource Location 2</location>
            <name>resource name 2</name>
            ...
        </virtual_machine>
        ...
    </resource_list>
</resource_list_response>
```

The BUDACTZ backup datacenter 304 may send a resource list output 345 to the client 302 to prompt the user to select resources (e.g., virtual machines) to protect. In one implementation, the resource list output may include data such as a request identifier, a resource list, and/or the like. In one embodiment, the BUDACTZ backup datacenter may provide the following example resource list output, substantially in the form of a HTTP(S) POST message including XML-formatted data, as provided below:

```
POST /resource_list_output.php HTTP/1.1
Host: www.server.com
Content-Type: Application/XML
Content-Length: 667
<?XML version = "1.0" encoding = "UTF-8"?>
<resource_list_output>
    <request_identifier>ID_request_4</request_identifier>
    <resource_list>
      <virtual_machine>
        <ID>ID_resource_1/ID>
        <location>resource Location 1</location>
        <name>resource name 1</name>
        ...
      </virtual_machine>
      <virtual_machine>
        <ID>ID_resource_2</ID>
        <location>resource Location 2</location>
        <name>resource name 2</name>
        ...
      </virtual_machine>
      ...
    </resource_list>
</resource_list_output>
```

The client 302 may send a resource selection input 349 to the BUDACTZ backup datacenter 304 with the user's selection of partner zone resources in the partner shared cloud protected zone that should be backed up. In one implementation, the resource selection input may include data such as a response identifier, a set of selected resources to protect, and/or the like. In one embodiment, the client may provide the following example resource selection input, substantially in the form of a HTTP(S) POST message including XML-formatted data, as provided below:

POST /resource_selection_input.php HTTP/1.1
Host: www.server.com
Content-Type: Application/XML
Content-Length: 667
<?XML version="1.8" encoding="UTF-8"?>
<resource_selection_input>
  <response_identifier>ID_response_4</response_identifier>
  <selected_resources>ID_resource_1, ID_resource_2, . . . </selected_resources>
</resource_selection_input>

The BUDACTZ backup datacenter 304 may send a resource backup registration request 353 to a BUDACTZ shared cloud backup zone 308 to facilitate registering the selected partner zone resources for backup protection. In one implementation, the resource backup registration request may include data such as a request identifier, a request type, a partner identifier, a partner zone identifier, partner zone service account credentials, a set of selected resources to protect, and/or the like. In one embodiment, the BUDACTZ backup datacenter may provide the following example resource backup registration request, substantially in the form of a HTTP(S) POST message including XML-formatted data, as provided below:

POST /resource_backup_registration_request.php HTTP/1.1
Host: www.server.com
Content-Type: Application/XML
Content-Length: 667
<?XML version="1.8" encoding="UTF-8"?>
<resource_backup_registration_request>
  <request_identifier>ID_request_5</request_identifier>
  <request_type>REGISTER_RESOURCES</request_type>
  <partner_identifier>ID_partner_1</partner_identifier>
  <partner_zone_identifier>ID_PartnerZone_1</partner_zone_identifier>
  <service_account_credentials>
    <username>backup_service_name</username>
    <password>backup_service_password</password>
  </service_account_credentials>
  <selected_resources>ID_resource_1, ID_resource_2, . . . </selected_resources>
</resource_backup_registration_request>

A resource backup registering (RBR) component 357 may utilize data provided in the resource backup registration request to register the selected partner zone resources for backup protection. See FIG. 5 for additional details regarding the RBR component.

The BUDACTZ shared cloud backup zone 308 may send a backup agent install request 361 to the partner shared cloud protected zone 306 to facilitate backup agent installation on a protected partner zone resource. It is to be understood that, in some implementations, a separate backup agent install request may be sent for each protected partner zone resource. In one implementation, the backup agent install request may include data such as a request identifier, a request type, a partner zone identifier, partner zone service account credentials, a resource identifier, backup agent data, an installation token, and/or the like. In one embodiment, the BUDACTZ shared cloud backup zone may provide the following example backup agent install request, substantially in the form of a HTTP(S) POST message including XML-formatted data, as provided below:

POST /backup_agent_install_request.php HTTP/1.1
Host: www.server.com
Content-Type: Application/XML
Content-Length: 667
<?XML version="1.8" encoding="UTF-8"?>
<backup_agent_install_request>
  <request_identifier>ID_request_6</request_identifier>
  <request_type>INSTALL_BACKUP_AGENT</request_type>
  <partner_zone_identifier>ID_PartnerZone_1</partner_zone_identifier>
  <service_account_credentials>
  <username>backup_service_name</username>
  <password>backup_service_password</password>
  </service_account_credentials>
  <resource_identifier>ID_resource_1</resource_identifier>
  <backup_agent_data>backup agent software</backup_agent_data>
  <installation_token>backup agent installation token</installation_token>
</backup_agent_install_request>

The partner shared cloud protected zone 306 may send a backup agent install response 365 to the BUDACTZ shared cloud backup zone 308 to confirm whether the backup agent was installed successfully. In one implementation, the backup agent install response may include data such as a response identifier, a status, and/or the like. In one embodiment, the partner shared cloud protected zone may provide the following example backup agent install response, substantially in the form of a HTTP(S) POST message including XML-formatted data, as provided below:

POST /backup_agent_install_response.php HTTP/1.1
    Host: www.server.com
    Content-Type: Application/XML
    Content-Length: 667
    <?XML version="1.8" encoding="UTF-8"?>
    <backup_agent_install_response>
       <response_identifier>ID_response_6</response_identifier>
       <status>OK</status>
    </backup_agent_install_response>

The BUDACTZ shared cloud backup zone 308 may send a resource backup registration response 369 to the BUDACTZ backup datacenter 304 to confirm whether the selected partner zone resources were registered for backup protection successfully. In one implementation, the resource backup registration response may include data such as a response identifier, a status, and/or the like. In one embodiment, the BUDACTZ shared cloud backup zone may provide the following example resource backup registration response, substantially in the form of a HTTP(S) POST message including XML-formatted data, as provided below:

POST /resource_backup_registration_response.php HTTP/1.1
    Host: www.server.com
    Content-Type: Application/XML
    Content-Length: 667
    <?XML version="1.8" encoding="UTF-8"?>
    <resource_backup_registration_response>
       <response_identifier>ID_response_5</response_identifier>
       <status>OK</status>
    </resource_backup_registration_response>

The BUDACTZ backup datacenter 304 may send a resource backup registration output 373 to the client 302 to inform the user whether the selected partner zone resources were registered for backup protection successfully. In one implementation, the resource backup registration output may include data such as a response identifier, a status, and/or the like. In one embodiment, the BUDACTZ backup datacenter may provide the following example resource backup registration output, substantially in the form of a HTTP(S) POST message including XML-formatted data, as provided below:

POST /resource_backup_registration_output.php HTTP/1.1
    Host: www.server.com
    Content-Type: Application/XML
    Content-Length: 667
    <?XML version="1.8" encoding="UTF-8"?>
    <resource_backup_registration_output>
       <response_identifier>ID_response_1</response_identifier>
       <status>OK</status>
    </resource_backup_registration_output>

FIG. 4 shows non-limiting, example embodiments of a logic flow illustrating a resource backup configuring (RBC) component for the BUDACTZ. In FIG. 4, a resource backup configuration request may be obtained at 401. For example, the resource backup configuration request may be obtained as a result of a user request to register a set of partner zone resources for backup protection.

An associated partner shared cloud protected zone may be determined at 405. For example, the partner zone may be a logically separate sub-unit of a shared cloud (e.g., Azure) associated with a partner (e.g., in a cloud region). In one implementation, the resource backup configuration request may be parsed (e.g., using PHP commands) to determine the associated partner zone (e.g., based on the values of the partner_identifier and/or partner_zone_identifier fields).

An associated shared cloud backup zone may be determined at 409. For example, the backup zone may be a logically separate sub-unit of the shared cloud associated with the BUDACTZ (e.g., in the cloud region). In one embodiment, a backup zone in a cloud region may be utilized for resource backups of partner zones (e.g., of any partner in the cloud region, dedicated to a particular partner) in the cloud region. In one implementation, a configuration setting, a database record, and/or the like may be checked to determine the backup zone associated with the cloud region of the associated partner zone. In another implementation, a new backup zone may be created (e.g., for the cloud region, the partner, the partner zone, and/or the like).

A partner zone administrator authorization token may be requested at 413. For example, the administrator authorization token may provide the BUDACTZ with administrative privileges to the associated partner shared cloud protected zone. In one embodiment, the administrator authorization token may be obtained using the OAuth framework. In one implementation, the OAuth 2.0 protocol (e.g., with Azure Active Directory, or another authorization server) may be utilized to obtain the administrator authorization token. For example, a user (e.g., an administrator) associated with the partner may provide login credentials to the authorization server to authorize issuance of the administrator authorization token.

A determination may be made at 417 whether the administrator authorization token was obtained. If the administrator authorization token was not obtained, an error message may be generated at 433. For example, the error message may inform the user regarding the error (e.g., unable to obtain administrator authorization token).

If the administrator authorization token was obtained, a partner zone service account may be created at 421. For example, the service account may be used to provide the BUDACTZ with specific permissions to perform actions in the associated partner shared cloud protected zone. In one implementation, the service account may be created via an API call to the partner zone (e.g., executed "on behalf of" the administrator). For example, the partner zone service account may be created via an API call similar to the following:

```
BUDACTZ API:
PUT /v2/azure/tenant/:tenantUuid/subscription/:subscriptionUuid/account?code=<string>
[Empty body]
Where "code" is an oauth2 access code, provided through the "on behalf of" oauth flow.
Backend Azure APIs:
Request #1
POST https://graph.windows.net/[subscription]/applications?api-version=1.6
{
    "availableToOtherTenants": false,
```

```
"passwordCredentials": [
  {
    "startDate": "[ISO 8601 date]",
    "endDate": "[ISO 8601 date]",
    "keyId": "[UUID]",
    "value": "[Password value]",
    "customKeyIdentifier": "[Azure specific resource identifier]"
  }
],
"displayName": "[Alphanumeric string]",
"identifierUris": [ ]
}
Response :
{
  ... [Various fields] ...
  "appId": "[UUID]"
}
Request #2
POST https://graph.windows.net/[subscription]/servicePrincipals?api-version=1.6
{
  "accountEnabled": "True",
  "appId": "[UUID obtained in the response of previous request]"
}
```

At this point there is a service principal that can be used for subsequent steps (e.g., grant RBAC).

A determination may be made at 425 whether the partner zone service account was generated successfully. If the service account was not generated successfully, an error message may be generated at 433. For example, the error message may inform the user regarding the error (e.g., unable to generate partner zone service account).

If the service account was generated successfully, service account specific permissions may be granted to the partner zone service account at 429. For example, such permissions may include: install backup agent, run backup agent, read data, and/or the like. In one implementation, the service account specific permissions may be granted via an API call to the partner zone. For example, the service account specific permissions may be granted via an API call similar to the following.

```
BUDACTZ API:
PUT /v2/azure/tenant/:tenantUuid/subscription/:subscriptionUuid/rbac?code=<string>
[Empty body]
Where "code" is an oauth2 access code, provided through the "on behalf of" oauth flow.
Backend Azure API calls:
PUT
https://management.azure.com/{scope}/providers/Microsoft.Authorization/roleAssignments/
{roleAssignmentId}?api-version={version}
{
  "properties": {
    "roleDefinitionId":
"/{scope}/providers/Microsoft.Authorization/roleDefinitions/{roleDefinitionId}",
    "principalId": "{principalId}"
  }
}
This assumes a role definition exists. In one implementation, a custom role definition
may be created as follows:
PUT
https://management.azure.com/{scope}/providers/Microsoft.Authorization/roleDefinitions/
{roleDefinitionId}?api-version={version}
{
  "name": "{roleDefinitionId}",
  "properties": {
    "roleName": "",
    "description": "",
    "type": "CustomRole",
    "permissions": [
      {
        "actions": [
        ... [List of actions that we are allowed to perform] ...
        ],
        "notActions": [
        ]
      }
    ],
    "assignableScopes": [
    ]
  }
}
```

A list of partner zone resources (e.g., virtual machines) may be obtained at 437. For example, the partner zone resources list may specify partner zone resources in the partner shared cloud protected zone that may be backed up. In one implementation, the partner zone resources list may be obtained via an API call (e.g., Azure Compute/Virtual-Machines/List All API call) to the partner zone. For example, the partner zone resources list may be obtained via an API call similar to the following.

```
The request uses Microsoft's "Resource Graph Query" API.
BUDACTZ API:
GET /v2/azure/subscription/{subscriptionUuid}/virtual-
machine?region={{region}}
Response :
{
   "items": [
     {
        "id": [Azure specific arbitrary resource ID string],
        "name": [VM name, alphanumeric],
        "powerState": [Running, Starting, Stopping, Stopping, Stopped],
        "totalDiskSpaceGb": [Size in GiB],
        "isAgentInstalled": [true/false, Whether or not the Azure agent is
installed],
        "isPairable": [true/false, Whether or not we believe this VM is not
yet paired],
        "meetsMinimumSpec": [true/false, Whether or not we believe the
VM meets the minimum spec]
        "hasUnmanagedDisks": [true/false, Whether or not this VM has
unsupported unmanaged disks, this is Azure specific],
        "unpairableReasonCode": [If isPairable = false, why? This code is
used to translate to human readable text on the front end. e.g., "This VM
cannot be paired because it has unmanaged disks"]
     },
      ... [There are many VMs] ...
   ]
}
Backend Azure API calls:
POST https://management.azure.com/providers/Microsoft.ResourceGraph/
resources?api-version={{Version}}
{
   "subscriptions": [
      "{{Subscription ID}}"
   ],
   "query": "{{QUERY}}"
}
The "QUERY" may be similar to the following:
Resources | where type =~ 'microsoft. compute/virtualmachines'
          | where location =~ '[[REGION]]'
          | project
               id = id, name = name,
               powerState =
tostring(properties.extended.instanceView.powerState.displayStatus),
               osDisk = (properties.storageProfile.osDisk),
               dataDisks = (properties.storageProfile.dataDisks),
               os = properties.storageProfile.osDisk.osType,
               vmSize = properties.hardwareProfile.vmSize
```

A partner zone resources selection may be obtained from the user at 441. In one embodiment, the user may be prompted (e.g., via BUDACTZ user interface) to select partner zone resources in the partner shared cloud protected zone that should be backed up. In one implementation, the partner zone resources selection may be obtained from the user via a resource selection input.

The selected partner zone resources may be registered with the shared cloud backup zone at 445. In one embodiment, registering the selected partner zone resources sets up these resources for backup protection with the shared cloud backup zone. In one implementation, the selected partner zone resources may be registered with the shared cloud backup zone via a resource backup registration request.

FIG. 5 shows non-limiting, example embodiments of a logic flow illustrating a resource backup registering (RBR) component for the BUDACTZ. In FIG. 5, a resource backup registration request may be obtained at 501. For example, the resource backup registration request may be obtained as a result of a request from the RBC component to register a set of partner zone resources for backup protection with a shared cloud backup zone (e.g., executing the RBR component).

An associated partner shared cloud protected zone may be determined at 505. For example, the partner zone may be a logically separate sub-unit of a shared cloud (e.g., Azure) associated with a partner (e.g., in a cloud region). In one implementation, the resource backup registration request may be parsed (e.g., using PHP commands) to determine the associated partner zone (e.g., based on the values of the partner identifier and/or partner_zone_identifier fields).

A set of partner zone resources to register may be determined at 509. For example, the set of partner zone resources to register may specify partner zone resources in the partner shared cloud protected zone that should be set up for backup protection with the shared cloud backup zone. In one implementation, the resource backup registration request may be parsed (e.g., using PHP commands) to determine the set of partner zone resources to register (e.g., based on the value of the selected_resources field).

A corresponding backup resource may be created in the shared cloud backup zone at 513. For example, the corresponding backup resource may be used to store backup data for the set of partner zone resources to register (e.g., including partner zone resources snapshots and/or miscellaneous other information about partner zone resources). In one embodiment, a corresponding virtual machine may be created in the backup zone for each partner zone resource in the set of partner zone resources. In one implementation, the corresponding backup resource may be created via an API call (e.g., one or more Azure Compute/Virtual Machines/Create API calls) to the backup zone. In another implementation, the corresponding backup resource may be created via a "Jobs" system using a Job similar to the following:

```
An example of a completed Job:
{
   "currentStageIndex": 3,
   "stageStates": [
      {
         "name": "CreateAzureVirtualMachineStage",
         "async": true,
         "currentStatus": "complete",
         "index": 0,
         "errorMessage": null,
         "startTime": 1652127727,
         "duration": 61
      },
      {
         "name": "WaitForDeviceStage",
         "async": true,
         "currentStatus": "complete",
         "index": 1,
         "errorMessage": null,
         "startTime": 1652127788,
         "duration": 182
      },
      {
         "name": "VerifyDeviceStage",
         "async": true,
         "currentStatus": "complete",
         "index": 2,
         "errorMessage": null,
         "startTime": 1652127970,
         "duration": 7137
      },
      {
         "name": "CreateInstallPairJobsStage",
```

```
        "async": true,
        "currentStatus": "complete",
        "index": 3,
        "errorMessage": null,
        "startTime": 1652135107,
        "duration": 64
      }
    ],
    "complete": true,
    "context": {
      "stageStartTime": 1652135107,
      "resellerUuid": "[UUID]",
      "leaseId": 737,
      "deploymentId": "[UUID]",
      "retries": 0,
      "subscriptionId": "[UUID]",
      "resourceGroupName": "[Tenant specific RG]",
      "clientId": [Integer],
      "deviceName": "[Device Name]",
      "azureRegion": "[Azure region code]",
      "billingAcknowledgment": true,
      "azureResourceIdsToProtect": [
          "[Azure specific resource ID]",
          "[Azure specific resource ID]"
      ],
      "rebootFlag": true,
      "rebootSchedule": "2022-05-10T03:20:00.000Z",
      "deviceId": [Generated device ID int],
      "skuId": "[BUDACTZ specific SKU id]",
      "billingTermsAndConditions": {
        "userEmail": "[Email of the user who agreed to the terms]"
      }
      "billingPriceEstimate": {
        "totalPriceWithDiscounts": [Dollars and cents XX.XX],
        "currency": "USD"
      },
      "billingCommitmentId": 4,
      "billingSubscriptionId": 3909060
    },
    "transactionFailureInfo": null
}
```

These Jobs are periodically picked up by a cron, and that cron knows how to advance this object through the defined stages.
 CreateAzureVirtualMachineStage: Use Azure APIs to create the VM
 WaitForDeviceStage: Wait for the device to check in
 VerifyDeviceStage: Run an initial health check on the device, to ensure that the device certificates (that allow device communication) were properly provisioned
 CreateInstallPairJobsStage: This triggers other Jobs that facilitate agent installation and pairing A partner zone service account to use may be determined at 517. For example, the service account may be used to perform actions in the associated partner shared cloud protected zone. In one implementation, the resource backup registration request may be parsed (e.g., using PHP commands) to determine the partner zone service account to use (e.g., based on the value of the service_account_credentials field).

A determination may be made at 521 whether there remain partner zone resources to register. In one implementation, each of the partner zone resources in the set of partner zone resources to register may be registered. If there remain partner zone resources to register, the next partner zone resource to register may be selected at 525.

A backup agent installation token for the selected partner zone resource may be generated at 529. In one embodiment, the backup agent installation token may be a unique token that establishes a relationship between the selected partner zone resource and the corresponding backup resource in the backup zone. In one implementation, the backup agent installation token may associate a backup agent on the selected partner zone resource and a virtual machine in the backup zone. For example, a backup agent installation token similar to the following may be generated:
 The token is a UUID (e.g., generated per IETF RFC 4122).
 Example: d67f1eb7-90a1-41de-8832-74348dd95f5f A backup agent may be installed on the selected partner zone resource using the service account and the backup agent installation token at 533. In one embodiment, the service account may be used to perform the installation action. In one implementation, installation of the backup agent software may be pushed to the selected partner zone resource using the service account via an API call to the partner zone. In another implementation, the backup agent may be installed on the selected partner zone resource via a "Jobs" system using a Job similar to the following:
 The shape of the Job context object is similar to that discussed with regard to 513, but utilizes different stages:
  InstallAgent—trigger a (Azure specific) runCommand call, which can run arbitrary powershell on target VMs
  The token is passed as a parameter to the powershell function, which we call the "seedConfig"
  seedConfig example: {"agent.uuid": [backup agent installation token], "cloudbase.client.url": https://[host of the checkin API for the agent, this is swappable primarily for dev purposes]}
  WaitForAgentCheckin—Wait for an agent to checkin using the provided token, and reports itself as the Azure resource ID defined in azureResourceIdsToProtect
  ValidatePendingState—Check to the checkin server, to ensure that the checkin server believes this agent is unpaired. The agent could be checking in (so passes WaitForAgentCheckin) but may already be paired. We do not allow re-pairing through this flow, so this is an "integrity check".
  SelectCloudDevice—This "selects" the corresponding backup resource.
  PairToCloudDevice—Instruct the cloud device to create a dataset for this agent. On successful provisioning, we transition the agent to "paired" which triggers it to start sending data to the device.
  StoreAzureMetadata—Store a snapshot of the VM's vmInstance view (Azure specific) for debugging purposes (e.g., store metadata such as (VM Name, Resource Group, VM SKU, OS Disk SKU, Data Disk SKUs, VM Generation, Network configuration, Total Disk size))

The selected partner zone resource may be associated with the corresponding backup resource at 537. In one embodiment, the backup agent installed on the selected partner zone resource may be associated with the corresponding backup resource using the backup agent installation token. In one implementation, the backup agent installed on the selected partner zone resource may check in with the BUDACTZ (e.g., with a backup datacenter, with the partner shared cloud protected zone) using the backup agent's partner zone address, and the backup agent may be associated with the corresponding backup resource. For example, the selected partner zone resource may be associated with the corresponding backup resource as follows:

After installation, the agent issues a certificate signing request (CSR) to the checkin server, the CSR's common name (CN) is the backup agent installation token (e.g., obtained from the seed file). The checkin server signs a certificate according to the CSR. The result is that the agent ends up with an mTLS client certificate containing the backup agent installation token. This TLS certificate is used for subsequent communication by the agent.

The agent does an Azure Instance Metadata Service (IMWDS) call from the VM that tells the agent where it is, in Azure. This IMDS information is decorated on subsequent checkin requests.

```
Checkin request:
{
  "uuid": [UUID],
  "hostname": [Agent's hostname],
  "ipv4Address": [The agent's view of the local ipv4 address of the host],
  "macAddress": [MAC of the VM],
  "operatingSystem": [e.g., "Windows Server 2016"],
  "operatingSystemArch": ["Linux" or "Windows"],
  "smbios": {
      ["System management bios" information that the agent can detect
about the BIOS of the host']
      "id": [BIOS ID],
      "uuid": [BIOS UUID],
      "name": [BIOS name],
      "vendor": [BIOS vendor]
  },
  "agentVersion": [e.g., "1.2.3.4"],
  "driverVersion": [e.g., "1.2.3.4"],
  "pairedDeviceId": [If the agent is paired, the device the agent
believes it is paired to, INT],
  "updateChannel": [e.g., "stable", "unstable"],
  "sirisAssetId": [If the agent is paired, the asset ID of the device the
agent believes it is paired to, string],
  "agentType": "azure",
  "externalIp": [The VM's internet facing IP],
  "lastSeen": [ISO8601 date],
  "azureSpecification": {
      "subscriptionId": [UUID],
      "resourceId": [The Azure specific resource ID]
  }
}
```

At this point, the pairing job is idling in WaitForAgentCheckin (see 533). After the first checkin, the job has enough to associate this agent: There is an agent checking in with the token we have issued, and that VM is reporting as being installed on the resourceId (through the azureSpecification).

Integrity checks may be performed at 541. In one embodiment, the integrity checks may be performed to ensure that data is not sent across cloud regions (e.g., to prevent draining limited bandwidth available from a shared cloud provider by avoiding data egress from the cloud region). For example, the following integrity checks may be performed:
  WaitForAgentCheckin
      There is an agent that is now checking in with the UUID we just generated
      That agent has the resourceID we expected (that it obtained through IMDS)
  ValidatePendingState—ensure that the checkin server believes the agent is not "paired"
  validateClientMatchesReseller—Ensure that the BUDACTZ end client matches their MSP reseller. There should be no way for a job to be enqueued for someone else's client, but we double check here.
  validateAgentExists—Legacy, duplicative with WaitForAgentCheckin
  validateAgentType—Check that the agent is a DCMA agent (e.g., and not Datto Windows Agent (DWA) agent).
  validateAgentAvailableForPairing—Legacy, duplicative with ValidatePendingState
  validateVersionRegistration—Legacy, globally reject agents that were installed during DCMA's beta testing
  validateRegionAvailable—Validate that this is a supported Azure agent
  validateSubscription—Validate that we have not lost access to the Partner's Azure tenant
  validateUniqueAgent—Ensure we don't have two different agents backing up with the same token (this means they may have moved their VM to a different resource group)
  validateAzureAgentVirtualMachine—Ensure that the VM meets the minimum resource limits for the DCMA agent, and double check that the VM does not have unmanaged disks
  validateAzureAgentDeviceRegion—ensure that the device region matches the agent region FIGS. 6A-B show non-limiting, example embodiments of a datagraph illustrating data flow(s) for the BUDACTZ. In FIGS. 6A-B, a partner shared cloud protected zone 606 (e.g., a backup agent installed on a protected partner zone resource in the partner zone) may send a resource backup execution request 621 to a BUDACTZ shared cloud backup zone 608 (e.g., a corresponding backup resource) to facilitate executing a backup of the protected partner zone resource. In one implementation, the resource backup execution request may include data such as a request identifier, a request type, a partner identifier, a partner zone identifier, a partner resource identifier, backup data, and/or the like. In one embodiment, the partner shared cloud protected zone may provide the following example resource backup execution request, substantially in the form of a HTTP(S) POST message including XML-formatted data, as provided below:

```
POST /resource_backup_execution_request.php HTTP/1.1
Host: www.server.com
Content-Type: Application/XML
Content-Length: 667
<?XML version="1.0" encoding="UTF-8"?>
<resource_backup_execution_request>
    <request_identifier>ID_request_11</request_identifier>
    <request_type>BACKUP_RESOURCE</request_type>
    <partner_identifier>ID_partner_1</partner_identifier>
    <partner_zone_identifier>ID_PartnerZone_1</partner_zone_identifier>
    <partner_resource_identifier>ID_resource_1</partner_resource_identifier>
    <backup_data>snapshot data</backup_data>
</resource_backup_execution_request>
```

A resource backup executing (RBE) component 625 may utilize data provided in the resource backup execution request to execute a backup of the protected partner zone resource to the backup zone and/or to a backup datacenter. See FIG. 7 for additional details regarding the RBE component.

The BUDACTZ shared cloud backup zone 608 (e.g., a zone device of the backup zone) may send a screenshot verification host request 629 to a BUDACTZ backup datacenter 604 to request a screenshot verification host for performing screenshot verification of the backup of the protected partner zone resource. In one implementation, the screenshot verification host request may include data such as a request identifier, a request type, a backup zone identifier, and/or the like. In one embodiment, the BUDACTZ shared cloud backup zone may provide the following example screenshot verification host request, substantially in the form of a HTTP(S) POST message including XML-formatted data, as provided below:

```
POST /screenshot_verification_host_request.php HTTP/1.1
Host: www.server.com
Content-Type: Application/XML
Content-Length: 667
<?XML version="1.0" encoding="UTF-8"?>
<screenshot_verification_host_request>
    <request_identifier>ID_request_12</request_identifier>
    <request_type>SCREENSHOT_VERIFICATIO_HOST</request_type>
    <backup_zone_identifier>ID_BackupZone_1</backup_zone_identifier>
</screenshot_verification_host_request>
```

The BUDACTZ backup datacenter 604 may send a screenshot verification host response 633 to the BUDACTZ shared cloud backup zone 608 with the requested screenshot verification host data. In one implementation, the screenshot verification host response may include data such as a response identifier, the requested screenshot verification host data, and/or the like. In one embodiment, the BUDACTZ backup datacenter may provide the following example screenshot verification host response, substantially in the form of a HTTP(S) POST message including XML-formatted data, as provided below:

```
POST /screenshot_verification_host_response.php HTTP/1.1
Host: www.server.com
Content-Type: Application/XML
Content-Length: 667
<?XML version="1.8" encoding="UTF-8"?>
<screenshot_verification_host_response>
    <response_identifier>ID_response_12</response_identifier>
    <screenshot_verification_host_data>
        <address>IP address of zone hypervisor</address>
        <login_domain>active directory domain (e.g., DATTO)</login_domain>
        <username>user that has virtualization privileges</username>
        <password>the user's password</password>
    </screenshot_verification_host_data>
</screenshot_verification_host_response>
```

A zone device 610 of the backup zone may send a mountpoint mount request 637 to a zone hypervisor 612 (e.g., to the IP address of the screenshot verification host) to instruct the zone hypervisor to mount a mountpoint (e.g., an iSCSI mountpoint corresponding to the backup) and/or to boot the corresponding virtual machine. In one implementation, the mountpoint mount request may include data such as a request identifier, a request type, a mountpoint target, login credentials, a virtual machine identifier, and/or the like. In one embodiment, the zone device may provide the following example mountpoint mount request, substantially in the form of a HTTP(S) POST message including XML-formatted data, as provided below:

```
POST /mountpoint_mount_request.php HTTP/1.1
Host: www.server.com
Content-Type: Application/XML
Content-Length: 667
<?XML version="1.8" encoding="UTF-8"?>
<mountpoint_mount_request>
    <request_identifier>ID_request_13</request_identifier>
    <request_type>MOUNT_MOUNTPOINT</request_type>
    <mountpoint_target>IP address of the iSCSI mountpoint</mountpoint_target>
    <login_domain>active directory domain (e.g., DATTO)</login_domain>
    <username>user that has virtualization privileges</username>
    <password>the user's password</password>
    <virtual_machine_identifier>ID_VirtualMachine_1</virtual_machine_identifier>
</mountpoint_mount_request>
```

The zone hypervisor 612 may send a mountpoint mount response 641 to the zone device 610 to confirm whether the mountpoint was mounted successfully. In one implementation, the mountpoint mount response may include data such as a response identifier, a status, and/or the like. In one embodiment, the zone hypervisor may provide the following example mountpoint mount response, substantially in the form of a HTTP(S) POST message including XML-formatted data, as provided below:

```
POST /mountpoint_mount_response.php HTTP/1.1
Host: www.server.com
Content-Type: Application/XML
Content-Length: 667
<?XML version="1.8" encoding="UTF-8"?>
<mountpoint_mount_response>
    <response_identifier>ID_response_13</response_identifier>
    <status>OK</status>
</mountpoint_mount_response>
```

The zone device 610 of the backup zone may send a screenshot verification request 645 to the zone hypervisor 612 to instruct the zone hypervisor to provide a verification screenshot of the corresponding virtual machine. In one implementation, the screenshot verification request may include data such as a request identifier, a request type, a virtual machine identifier, and/or the like. In one embodiment, the zone device may provide the following example screenshot verification request, substantially in the form of a HTTP(S) POST message including XML-formatted data, as provided below:

```
POST /screenshot_verification_request.php HTTP/1.1
Host: www.server.com
Content-Type: Application/XML
Content-Length: 667
<?XML version="1.8" encoding="UTF-8"?>
<screenshot_verification_request>
    <request_identifier>ID_request_14</request_identifier>
    <request_type>SCREENSHOT_VERIFICATION</request_type>
    <virtual_machine_identifier>ID_VirtualMachine_1</virtual_machine_identifier>
</screenshot_verification_request>
```

The zone hypervisor 612 may send a screenshot verification response 649 to the zone device 610 with the requested verification screenshot. In one implementation, the screenshot verification response may include data such as a response identifier, the requested verification screenshot, and/or the like. In one embodiment, the zone hypervisor may provide the following example screenshot verification response, substantially in the form of a HTTP(S) POST message including XML-formatted data, as provided below:

POST /screenshot_verification_response.php HTTP/1.1
Host: www.server.com
Content-Type: Application/XML
Content-Length: 667
<?XML version="1.8" encoding="UTF-8"?>
<screenshot_verification_response>
 <response_identifier>ID_response_14</response_identifier>
 <verification_screenshot>virtual machine screenshot</verification_screenshot>
</screenshot_verification_response>

The BUDACTZ shared cloud backup zone 608 may send a verification screenshot send request 653 to the BUDACTZ backup datacenter 604 to provide the verification screenshot and/or a backup verification status of the backup to the backup datacenter. In one implementation, the verification screenshot send request may include data such as a request identifier, a request type, a verification screenshot, a backup verification status, and/or the like. In one embodiment, the BUDACTZ shared cloud backup zone may provide the following example verification screenshot send request, substantially in the form of a HTTP(S) POST message including XML-formatted data, as provided below:

POST /verification_screenshot_send_request.php HTTP/1.1
Host: www.server.com
Content-Type: Application/XML
Content-Length: 667
<?XML version="1.8" encoding="UTF-8"?>
<verification_screenshot_send_request>
 <request_identifier>ID_request_15</request_identifier>
 <request_type>VERIFICATION_SCREENSHOT</request_type>
 <verification_screenshot>virtual machine screenshot</verification_screenshot>
 <status>OK</status>
</verification_screenshot_send_request>

The BUDACTZ backup datacenter 604 may send a verification screenshot send response 657 to the BUDACTZ shared cloud backup zone 608 to confirm whether the verification screenshot and/or the backup verification status of the backup were received successfully. In one implementation, the verification screenshot send response may include data such as a response identifier, a status, and/or the like. In one embodiment, the BUDACTZ backup datacenter may provide the following example verification screenshot send response, substantially in the form of a HTTP(S) POST message including XML-formatted data, as provided below:

POST /verification_screenshot_send_response.php HTTP/1.1
Host: www.server.com
Content-Type: Application/XML
Content-Length: 667
<?XML version="1.8" encoding="UTF-8"?>
<verification_screenshot_send_response>
 <response_identifier>ID_response_15</response_identifier>
 <status>OK</status>
</verification_screenshot_send_response>

The BUDACTZ shared cloud backup zone 608 may send a resource backup data send request 661 to the BUDACTZ backup datacenter 604 to provide the backup of the protected partner zone resource to the backup datacenter. In one implementation, the resource backup data send request may include data such as a request identifier, a request type, a partner identifier, a partner zone identifier, a partner resource identifier, backup data, and/or the like. In one embodiment, the BUDACTZ shared cloud backup zone may provide the following example resource backup data send request, substantially in the form of a HTTP(S) POST message including XML-formatted data, as provided below:

POST /resource_backup_data_send_request.php HTTP/1.1
Host: www.server.com
Content-Type: Application/XML
Content-Length: 667
<?XML version="1.8" encoding="UTF-8"?>
<resource_backup_data_send_request>
 <request_identifier>ID_request_16</request_identifier>
 <request_type>BACKUP_RESOURCE</request_type>
 <partner_identifier>ID_partner_1</partner_identifier>
 <partner_zone_identifier>ID_PartnerZone_1</partner_zone_identifier>
 <partner_resource_identifier>ID_resource_1</partner_resource_identifier>
 <backup_data>snapshot data</backup_data>
</resource_backup_data_send_request>

The BUDACTZ backup datacenter 604 may send a resource backup data send response 665 to the BUDACTZ shared cloud backup zone 608 to confirm whether the backup data was received successfully. In one implementation, the resource backup data send response may include data such as a response identifier, a status, and/or the like. In one embodiment, the BUDACTZ backup datacenter may provide the following example resource backup data send response, substantially in the form of a HTTP(S) POST message including XML-formatted data, as provided below:

POST /resource_backup_data_send_response.php HTTP/1.1
Host: www.server.com
Content-Type: Application/XML
Content-Length: 667
<?XML version="1.8" encoding="UTF-8"?>
<resource_backup_data_send_response>
 <response_identifier>ID_response_16</response_identifier>
 <status>OK</status>
</resource_backup_data_send_response>

The BUDACTZ shared cloud backup zone 608 (e.g., the zone device of the backup zone) may send a resource backup execution response 669 to the partner shared cloud protected zone 606 (e.g., the backup agent installed on the protected partner zone resource in the partner zone) to confirm whether the backup of the protected partner zone resource was executed successfully. In one implementation, the resource backup execution response may include data such as a response identifier, a status, and/or the like. In one embodiment, the BUDACTZ shared cloud backup zone may provide the following example resource backup execution response, substantially in the form of a HTTP(S) POST message including XML-formatted data, as provided below:

POST /resource_backup_execution_response.php HTTP/1.1
Host: www.server.com
Content-Type: Application/XML
Content-Length: 667
<?XML version="1.8" encoding="UTF-8"?>
<resource_backup_execution_response>

```
<response_identifier>ID_response_11</response_
    identifier>
<status>OK</status>
</resource_backup_execution_response>
```

FIG. 7 shows non-limiting, example embodiments of a logic flow illustrating a resource backup executing (RBE) component for the BUDACTZ. In FIG. 7, a resource backup execution request may be obtained at 701. For example, the resource backup execution request may be obtained by a shared cloud backup zone (e.g., executing the RBE component) as a result of a request from a backup agent installed on a protected partner zone resource to execute a (e.g., periodic, such as hourly, daily, monthly, etc.) backup of the protected partner zone resource.

An associated partner zone resource may be determined at 705. For example, the partner zone resource may be a virtual machine in a partner shared cloud protected zone associated with a partner. In one implementation, the resource backup execution request may be parsed (e.g., using PHP commands) to determine the associated partner zone resource (e.g., based on the values of the partner_identifier and/or partner_zone_identifier and/or partner_resource_identifier fields).

A corresponding backup resource may be determined at 709. For example, the corresponding backup resource may be used to store backup data for the associated partner zone resource in the shared cloud backup zone. In one implementation, the shared cloud backup zone may maintain database records associating partner zone resources with corresponding backup resources. For example, the corresponding backup resource for the associated partner zone resource may be determined via a MySQL database command similar to the following:

```
SELECT associatedBackupResourceID
FROM ResourceBackups
    WHERE   associatedPartnerID=ID_partner_1   AND
        associatedPartnerZoneID=ID_PartnerZone_1   AND
        associatedResourceID=ID_resource_1;
```

Partner zone resource backup data may be stored on the corresponding backup resource at 713. For example, the backup data may be a virtual machine snapshot (e.g., a ZFS snapshot) of the partner zone resource that may be utilized as a recovery point during a restore operation. In various implementations, the partner zone resource backup data may comprise a disk image (e.g., for a full backup), changes to a disk image (e.g., for an incremental backup, for a differential backup), and/or the like. For example, the partner zone resource backup data may be transferred using MercuryFTP.

A screenshot verification host in the shared cloud backup zone and associated credentials may be obtained at 717. For example, screenshot verification of backups may be run on a schedule (e.g., set to a random hour in the day, at the time of VM pairing). In one embodiment, a fleet of multi-tenant hosts in the shared cloud backup zone may be used to perform screenshot verification of backups (e.g., for multiple partners and/or partner zones) to share resources. In one implementation, a backup datacenter may be queried to determine the screenshot verification host in the shared cloud backup zone and the associated credentials. For example, the screenshot verification host in the shared cloud backup zone and the associated credentials may be obtained as follows:

```
Request:    v1/device/asset/agent/screenshot/getHypervi-
    sorInfo
Response:
{
    "address": [IP address of zone hypervisor].
    "loginDomain": [active directory domain (e.g.,
        DATTO)],
    "username": [user that has virtualization privileges],
    "password": [the user's password]
}
```

A mountpoint for the backup of the protected partner zone resource may be created at 721. In one implementation, an iSCSI mountpoint corresponding to the backup may be created. For example, the mountpoint may be created as follows:

```
sudo targetcli /iscsi create [iSCSI Qualified Name (IQN)]
```

Zone hypervisor in the shared cloud backup zone may be instructed to mount the mountpoint at 725. In one implementation, the determined IP address of the zone hypervisor and the associated credentials may be used to send a mountpoint mount request to the zone hypervisor. For example, the zone hypervisor may be instructed to mount the mountpoint as follows:

Hypervisors are instructed to execute powershell commands using a linux utility called "winexe". Winexe commands look like this (one line):

winexe --ostype-2 --authentication-file-[file containing username and password in a format required by winexe] //[ip4_address] powershell.exe -ExecutionPolicy Bypass -NoLogo -NonInteractive -NoProfile -WindowStyle Hidden -Command "[ARBITRARY POWERSHELL COMMANDS]"

This orchestrates the HyperV host through winexesvc.exe to execute powershell on the remote host.

The powershell executed in this case is as follows:

Trigger iSCSI initiator connect:

Set-Service -Name MSiSCSI -StartupType Automatic

Start-Service MSiSCSI

New-IscsiTargetPortal -TargetPortaladdress [DEVICES IP4 ADDRESS]

Connect-IscsiTarget -NodeAddress [IQN from [8090]]

Get-IscsiSession|Where-Object TargetNodeAddress -eq "[IQN from 721]"|Register-IscsiSession Poll until iSCSI connects and the disk has been given a device id: Get-WmiObject -Namespace root\ WMI -Class MSiSCSIInitiator_SessionClass -Filter "TargetName="'% s'""|Select-Object -ExpandProperty Devices|Select-Object DeviceNumber|ConvertToJson This returns an array, when all the device numbers are set to something NOT equal to 4294967295 (Windows defines this as INVALID_DEVICE_NUMBER) then the process is complete.

A virtual machine (VM) of the backup of the protected partner zone resource may be created and/or booted at 729. In one implementation, the zone hypervisor may be instructed to created and boot the VM of the backup. For example, the VM of the partner zone resource backup data may be created and booted as follows:

The VM is defined through libvirt-php (and subsequently libvirt), using the libvirt_domain_define_xml function.

The XML is in the following format:

<?xml version="1.0"?><domain type="hyperv"><name> [HYPERVISOR NAME]</name><memory unit="MiB">1536</memory><vcpu>2</ vcpu><os><type arch="x86_64">hvm</type><boot dev="cdrom"/><boot dev="hd"/> </os><features><acpi/><apic/></features><clock offset="localtime"/><pm><suspend-to-mem enabled="no"/><suspend-to-disk enabled="no"/> </pm><devices><disk type="block" device="disk"><source dev="2"/><target dev="hda" bus="ide"/></disk><disk type="block"

device="disk"><source dev="3"/><target dev="hdb" bus="ide"/></disk><controller type="scsi" index="B" model="auto"/></devices></domain>

A determination may be made at 733 whether VM boot time has elapsed. In one implementation, a VM may be allowed a specified boot time length (e.g., 5 minutes) to boot. If the VM boot time has not elapsed, the BUDACTZ may wait at 737. In one implementation, the BUDACTZ may wait the specified boot time length.

If the VM boot time has elapsed, a verification screenshot may be obtained from the zone hypervisor at 741. For example, the verification screenshot may show an image of the VM screen. In one implementation, the zone hypervisor may be instructed to provide the verification screenshot. For example, the verification screenshot may be obtained as follows:

virsh screenshot vm-name
Virsh is an open source wrapper to libvirt.

In one embodiment, the verification screenshot may be evaluated by performing context-sensitive tests against the VM's output to determine a pass or fail backup verification status (e.g., to confirm the ability of the VM to boot the operating system of the protected partner zone resource).

A determination may be made at 745 whether the backup verification status indicates that verification of the VM was successful. If the VM failed the verification, an error message may be generated at 749. For example, the error message may inform a user (e.g., via an email notification) that the verification of the VM was unsuccessful.

If the VM passed the verification, the partner zone resource backup data may be sent to a backup datacenter at 753. For example, the backup datacenter may be an external cloud, such as a private cloud. In one embodiment, storing the backup in the backup datacenter provides an additional layer of protection for the protected partner zone resource. In one implementation, the partner zone resource backup data may be sent via a resource backup data send request. For example, the partner zone resource backup data may be transferred using MercuryFTP.

FIGS. 8A-B show non-limiting, example embodiments of a datagraph illustrating data flow(s) for the BUDACTZ. In FIGS. 8A-B, dashed lines indicate data flow elements that may be more likely to be optional. In FIGS. 8A-B, a client 802 (e.g., of a user) may send a resource restore input 821 to a BUDACTZ backup datacenter 804 to facilitate executing a restore of a protected partner zone resource. For example, the client may be a desktop, a laptop, a tablet, a smartphone, a smartwatch, and/or the like that is executing a client application. In one implementation, the resource restore input may include data such as a request identifier, a request type, a partner identifier, a partner zone identifier, a partner resource identifier, a partner zone administrator authorization token, and/or the like. In one embodiment, the client may provide the following example resource restore input, substantially in the form of a HTTP(S) POST message including XML-formatted data, as provided below:

POST /resource_restore_input.php HTTP/1.1
Host: www.server.com
Content-Type: Application/XML
Content-Length: 667
<?XML version="1.8" encoding="UTF-8"?>
<resource_restore_input>
　　<request_identifier>ID_request_21</request_identifier>
　　<request_type>RESTORE_RESOURCE</request_type>
　　<partner_identifier>ID_partner_1</partner_identifier>
　　<partner_zone_identifier>ID_PartnerZone_1</partner_zone_identifier>
　　<partner_resource_identifier>ID_resource_1</partner_resource_identifier>
　　<partner_zone_token>admistrator authorization token</partner_zone_token>
</resource_restore_input>

A resource restore executing (RRE) component 825 may utilize data provided in the resource restore input to execute a restore of the protected partner zone resource from a shared cloud backup zone and/or from the backup datacenter to a partner shared cloud protected zone. See FIG. 9 for additional details regarding the RRE component.

In one embodiment, the protected partner zone resource may be restored from backup data stored in the backup datacenter. For example, configurations, virtual network cards with minimal configuration data, and/or the like low data usage resource types may be restored from the backup datacenter. In this embodiment, the BUDACTZ backup datacenter 804 may send a resource restore execution request 829 to a partner shared cloud protected zone 806 to provide the backup data (e.g., configuration data) of the protected partner zone resource to the partner shared cloud protected zone. In one implementation, the resource restore execution request may include data such as a request identifier, a request type, a partner identifier, a partner zone identifier, a partner resource identifier, a partner zone administrator authorization token, backup data, and/or the like. In one embodiment, the BUDACTZ backup datacenter may provide the following example resource restore execution request, substantially in the form of a HTTP(S) POST message including XML-formatted data, as provided below:

POST /resource_restore_execution_request.php HTTP/1.1
Host: www.server.com
Content-Type: Application/XML
Content-Length: 667
<?XML version="1.8" encoding="UTF-8"?>
<resource_restore_execution_request>
　　<request_identifier>ID_request_22</request_identifier>
　　<request_type>EXECUTE_RESOURCE_RESTORE</request_type>
　　<partner_identifier>ID_partner_1</partner_identifier>
　　<partner_zone_identifier>ID_PartnerZone_1</partner_zone_identifier>
　　<partner_resource_identifier>ID_resource_1</partner_resource_identifier>
　　<partner_zone_token>admistrator authorization token</partner_zone_token>
　　<backup_data>configuration data</backup_data>
</resource_restore_execution_request>

The partner shared cloud protected zone 806 may send a resource restore execution response 833 to the BUDACTZ backup datacenter 804 to confirm whether the restoration of the protected partner zone resource was executed successfully. In one implementation, the resource restore execution response may include data such as a response identifier, a status, and/or the like. In one embodiment, the partner shared cloud protected zone may provide the following example resource restore execution response, substantially in the form of a HTTP(S) POST message including XML-formatted data, as provided below:

POST /resource_restore_execution_response.php HTTP/1.1
Host: www.server.com
Content-Type: Application/XML Content-Length: 667
<?XML version="1.8" encoding="UTF-8"?>
<resource_restore_execution_response>
    <response_identifier>ID_response_22</response_identifier>
    <status>OK</status>
</resource_restore_execution_response>

In another embodiment, the protected partner zone resource may be restored from backup data stored in a shared cloud backup zone. For example, virtual machines of operating systems (e.g., Windows, Linux), and/or the like high data usage resource types may be restored from a shared cloud backup zone. In this embodiment, the BUDACTZ backup datacenter 804 may send a resource restore request 837 to a BUDACTZ shared cloud backup zone 808 to instruct the shared cloud backup zone to restore the protected partner zone resource. In one implementation, the resource restore request may include data such as a request identifier, a request type, a partner identifier, a partner zone identifier, a partner resource identifier, partner zone restore account credentials, and/or the like. In one embodiment, the BUDACTZ backup datacenter may provide the following example resource restore request, substantially in the form of a HTTP(S) POST message including XML-formatted data, as provided below:

POST /resource_restore_request.php HTTP/1.1
Host: www.server.com
Content-Type: Application/XML
Content-Length: 667
<?XML version="1.8" encoding="UTF-8"?>
<resource_restore_request>
    <request_identifier>ID_request_23</request_identifier>
    <request_type>RESTORE_RESOURCE</request_type>
    <partner_identifier>ID_partner_1</partner_identifier>
    <partner_zone_identifier>ID_PartnerZone_1</partner_zone_identifier>
    <partner_resource_identifier>ID_resource_1</partner_resource_identifier>
    <restore_account_credentials>
        <username>restore_service_name</username>
        <password>restore_service_password</password>
    </restore_account_credentials>
</resource_restore_request>

The BUDACTZ shared cloud backup zone 808 may send a resource restore execution request 841 to the partner shared cloud protected zone 806 to provide the backup data (e.g., VM snapshot data) of the protected partner zone resource to the partner shared cloud protected zone. In one implementation, the resource restore execution request may include data such as a request identifier, a request type, a partner identifier, a partner zone identifier, a partner resource identifier, partner zone service account credentials, backup data, and/or the like. In one embodiment, the BUDACTZ shared cloud backup zone may provide the following example resource restore execution request, substantially in the form of a HTTP(S) POST message including XML-formatted data, as provided below:

POST /resource_restore_execution_request.php HTTP/1.1
Host: www.server.com
Content-Type: Application/XML
Content-Length: 667
<?XML version="1.8" encoding="UTF-8"?>
<resource_restore_execution_request>
    <request_identifier>ID_request_24</request_identifier>
    <request_type>EXECUTE_RESOURCE_RESTORE</request_type>
    <partner_identifier>ID_partner_1</partner_identifier>
    <partner_zone_identifier>ID_PartnerZone_1</partner_zone_identifier>
    <partner_resource_identifier>ID_resource_1</partner_resource_identifier>
    <restore_account_credentials>
        <username>restore_service_name</username>
        <password>restore_service_password</password>
    </restore_account_credentials>
    <backup_data>VM snapshot data</backup_data>
</resource_restore_execution_request>

The partner shared cloud protected zone 806 may send a resource restore execution response 845 to the BUDACTZ shared cloud backup zone 808 to confirm whether the restoration of the protected partner zone resource was executed successfully. In one implementation, the resource restore execution response may include data such as a response identifier, a status, and/or the like. In one embodiment, the partner shared cloud protected zone may provide the following example resource restore execution response, substantially in the form of a HTTP(S) POST message including XML-formatted data, as provided below:

POST /resource_restore_execution_response.php HTTP/1.1
Host: www.server.com
Content-Type: Application/XML
Content-Length: 667
<?XML version="1.8" encoding="UTF-8"?>
<resource_restore_execution_response>
    <response_identifier>ID_response_24</response_identifier>
    <status>OK</status>
</resource_restore_execution_response>

The BUDACTZ shared cloud backup zone 808 may send a resource restore response 849 to the BUDACTZ backup datacenter 804 to confirm whether the protected partner zone resource was restored successfully. In one implementation, the resource restore response may include data such as a response identifier, a status, and/or the like. In one embodiment, the BUDACTZ shared cloud backup zone may provide the following example resource restore response, substantially in the form of a HTTP(S) POST message including XML-formatted data, as provided below:

POST /resource_restore_response.php HTTP/1.1
Host: www.server.com
Content-Type: Application/XML
Content-Length: 667
<?XML version="1.8" encoding="UTF-8"?>
<resource_restore_response>
    <response_identifier>ID_response_23</response_identifier>
    <status>OK</status>
</resource_restore_response>

The BUDACTZ backup datacenter 804 may send a resource restore output 853 to the client 802 to inform the user whether the protected partner zone resource was restored successfully. In one implementation, the resource restore output may include data such as a response identifier, a status, and/or the like. In one embodiment, the BUDACTZ backup datacenter may provide the following example resource restore output, substantially in the form of a HTTP(S) POST message including XML-formatted data, as provided below:

POST /resource_restore_output.php HTTP/1.1
Host: www.server.com
Content-Type: Application/XML
Content-Length: 667
<?XML version="1.8" encoding="UTF-8"?>
<resource_restore_output>
    <response_identifier>ID_response_21</response_identifier>
    <status>OK</status>
</resource_restore_output>

FIG. 9 shows non-limiting, example embodiments of a logic flow illustrating a resource restore executing (RRE) component for the BUDACTZ. In FIG. 9, a resource restore execution request may be obtained at 901. For example, the resource restore execution request may be obtained as a result of a user request to restore a protected partner zone resource (e.g., destroyed in a disaster).

An associated partner shared cloud protected zone may be determined at 905. For example, the partner zone may be a logically separate sub-unit of a shared cloud (e.g., Azure) associated with a partner (e.g., in a cloud region). In one implementation, the resource restore execution request may be parsed (e.g., using PHP commands) to determine the associated partner zone (e.g., based on the values of the partner_identifier and/or partner_zone_identifier fields).

A partner zone resource to restore in the associated partner zone may be determined at 909. For example, the partner zone resource to restore may be a virtual machine. In one implementation, the resource restore execution request may be parsed (e.g., using PHP commands) to determine the partner zone resource to restore (e.g., based on the value of the partner_resource_identifier fields).

A partner zone administrator authorization token may be requested at 913. For example, the administrator authorization token may provide the BUDACTZ with administrative privileges to the associated partner shared cloud protected zone. In one embodiment, the administrator authorization token may be obtained using the OAuth framework. In one implementation, the OAuth 2.0 protocol (e.g., with Azure Active Directory, or another authorization server) may be utilized to obtain the administrator authorization token. For example, a user (e.g., an administrator) associated with the partner may provide login credentials to the authorization server to authorize issuance of the administrator authorization token.

A determination may be made at 917 whether the administrator authorization token was obtained. If the administrator authorization token was not obtained, an error message may be generated at 933. For example, the error message may inform the user regarding the error (e.g., unable to obtain administrator authorization token).

If the administrator authorization token was obtained, a partner zone restore account may be obtained at 921. For example, the restore account may be used to provide the BUDACTZ with specific permissions to perform restore actions in the associated partner shared cloud protected zone. In one implementation, the restore account may be created via an API call to the partner zone. In another implementation, the restore account may be a corresponding partner zone service account created at 421, and may be retrieved from storage (e.g., credentials may be retrieved from a database). For example, the restore account may be used to request access to write backup data to a restored disk in the partner zone via an API call similar to the following:

Backend Azure API call:
POST https://management.azure.com/subscriptions/{subscriptionId}/resourceGroups/{resourceGroupName}/providers/Microsoft.Compute/disks/{diskName}/beginGetAccess?api-version={version}
{
  access: "{access level: 'write'}",
  durationInSeconds: "{duration in seconds}"
}
This request will return a token used in subsequent requests to write to the disk.

A determination may be made at 929 whether the partner zone restore account was obtained successfully. If the restore account was not obtained successfully, an error message may be generated at 933. For example, the error message may inform the user regarding the error (e.g., unable to obtain partner zone restore account).

A determination may be made at 937 whether the partner zone resource should be restored from a backup datacenter (e.g., executing the RRE component) or from a shared cloud backup zone. In one implementation, this determination may be made based on the resource type of the partner zone resource. For example, configurations, virtual network cards with minimal configuration data, and/or the like low data usage resource types may be restored from the backup datacenter. In another example, virtual machines of operating systems (e.g., Windows, Linux), and/or the like high data usage resource types may be restored from a shared cloud backup zone.

If the partner zone resource should be restored from the backup datacenter, the partner zone resource may be restored using backup data stored in the backup datacenter at 941. In one implementation, the associated partner shared cloud protected zone may be instructed to recreate the partner zone resource using backup data stored in the backup datacenter (e.g., using the administrator authorization token). For example, the partner zone resource may be restored via a "Jobs" system using a job similar to the following:

```
An example of a Job object shape:
{
    "restoreInfo": {
        "recoveryLaunchpadVersion": 2,
        "restoreId": INT,
        "assetId": INT,
        "assetName": "[STRING]",
        "snapshot": UNIX_TIMESTAMP,
        "machines": {
            "storage": {
                "type": "server",
                "id": INT
            },
            "compute": {
                "type": "server",
                "id": INT
            }
        },
        "directToCloud": true,
        "decrypted": false,
        "publicErrorMessage": null,
        "restoreType": "Azure Virtual Machine",
        "serverId": INT,
        "serverUri": "[STRING]",
        "serverName": "[STRING]",
        "deviceId": INT,
        "startTime": UNIX_TIMESTAMP,
        "stopTime": null,
        "state": "[STRING]",
        "stateChangedAt": UNIX_TIMESTAMP,
```

```
            "settings": [
                {
                    "name": "decrypted",
                    "value": false
                }
            ],
            "isPendingStateChange": true
        },
        "transactionState": {
            "currentStageIndex": 6,
            "stageStates": [
                {
                    "name": "GetAzureInformationStage",
                    "async": false,
                    "currentStatus": "complete",
                    "index": 0,
                    "errorMessage": null
                },
                {
                    "name": "CreateManagedDisksStage",
                    "async": true,
                    "currentStatus": "complete",
                    "index": 1,
                    "errorMessage": null
                },
                {
                    "name": "GrantDiskAccessStage",
                    "async": true,
                    "currentStatus": "complete",
                    "index": 2,
                    "errorMessage": null
                },
                {
                    "name" : "UploadDataToManagedDisksStage",
                    "async": true,
                    "currentStatus": "complete",
                    "index": 3,
                    "errorMessage": null
                },
                {
                    "name": "RevokeDiskAccessStage",
                    "async": true,
                    "currentStatus": "complete",
                    "index": 4,
                    "errorMessage": null
                },
                {
                    "name": "CreateVmStage",
                    "async": true,
                    "currentStatus": "complete",
                    "index": 5,
                    "errorMessage": null
                },
                {
                    "name": "GetAzureInformationStage",
                    "async": false,
                    "currentStatus": "rollback complete",
                    "index": 0,
                    "errorMessage": null
                }
            ],
            "complete": true,
            "context": {
                "agentUuid": "[STRING]",
                "deviceId": INT,
                "snapshotEpoch": UNIX_TIMESTAMP,
                "drives": [
                    {
                        "mountPoint": "C",
                        "size": INT,
                        "os": "windows",
                        "created": true,
                        "deploymentName": "[STRING]",
                        "grantAccessResponse": {
                            "sasUri": "[STRING]",
                            "statusUri": "[STRING]",
                            "done": true
                        },
                        "revokeAccessResponse": {
                            "sasUri": "",
                            "statusUri": "[STRING]",
                            "done": true
                        },
                        "diskName": "[STRING]"
                    }
                ],
                "targetTenantId": "[STRING]",
                "targetSubscriptionId": "[STRING]",
                "targetResourceGroup": "[STRING]",
                "vmDeploymentId": "[STRING]",
                "vmSize": "[STRING]",
                "azureRegion": "[STRING]",
                "publicErrorMessage": null
            }
        }
    }
```

A request is made to initiate a cloud restore to a BUDACTZ API. This request creates a Job to perform the actions used to restore the VM.

```
BUDACTZ API:
POST /v2/restore/azure-virtual-machine
{
    "asset": 0,
    "timestamp": 0,
    "restoreOptions": {
        "vmName": "string",
        "resourceGroupId": "string",
        "vmSizeId": "string",
        "publicIpId": "string",
        "osStorageTypeId": "string",
        "dataStorageTypeId": "string",
        "hyperVGenerationId": "string",
        "nicName": "string",
        "vnetId": "string",
        "subnetId": "string",
        "isTest": true
    }
}
```

This creates a Job with the following stages:
  InitializeStage—Logs the fact that we are starting a restore
  GetDiskInfoStage—Retrieves metadata about the disks that we will restore
  CreateManagedDisksStage—Creates managed disks for each disk that will be restored
  GrantDiskAccessStage—Retrieves a token for each disk that will be used to write data to the disk
  UploadDataToManagedDisksStage—Copies data from the backup datacenter to each managed disk
  RevokeDiskAccessStage—Revokes the access to each token retrieved during the GrantDiskAccessStage
  CreateVaStage—Creates the virtual machine using the restored disks
  FinalizeStage—Verifies the VM deployment has successfully completed and sends a notification Backend Azure API calls:

To create the managed disks and the virtual machine:

PUT https://management.azure.com/subscriptions/{subscriptionId}/resourcegroups/{resourceGroupName}/providers/Microsoft.Resources/deployments/{deployuentName}?api-version-{version}

The template provided in the body of this call will identify which resources are created.

To upload the data:
  Data is uploaded to each managed disk by spawning a process "azcopy" to copy the data from the backup datacenter to the partner zone using the token generated in the GrantDiskAccessStage If the partner zone resource should be restored from a shared cloud backup zone, a shared cloud backup zone associated with the partner zone resource may be determined at 945. For example, the backup zone may be a logically separate sub-unit of the shared cloud associated with the BUDACTZ (e.g., in the cloud region). In one implementation, a configuration setting, a database record, and/or the like may be checked to determine the backup zone associated with the cloud region of the associated partner zone.

A corresponding backup resource may be determined at 949. For example, the corresponding backup resource may store backup data for the partner zone resource in the associated shared cloud backup zone. In one implementation, the associated shared cloud backup zone may maintain database records associating partner zone resources with corresponding backup resources. For example, the corresponding backup resource for the partner zone resource may be determined via a MySQL database command similar to the following:
   SELECT associatedBackupResourceID
   FROM ResourceBackups
   WHERE    associatedPartnerID=ID_partner_1    AND
      associatedPartnerZoneID=ID_PartnerZone_1    AND
      associatedResourceID=ID_resource_1;

The partner zone resource may be restored using backup data stored in the corresponding backup resource in the associated shared cloud backup zone at 953. In one implementation, the associated partner shared cloud protected zone may be instructed to recreate the partner zone resource using backup data stored in the corresponding backup resource (e.g., using the temporary partner zone restore account credentials). For example, the partner zone resource may be restored via a "Jobs" system using a job similar to the following: The process for performing the restore is similar to that discussed with regard to 941.
  The shape of the Job object is similar to that discussed with regard to 941, but with a different UploadData-ToManagedDisksStage value—the data is coming from the shared cloud backup zone. The data is still uploaded to each managed disk by spawning a process "azcopy" to copy the data.

FIG. 10 shows non-limiting, example embodiments of a screenshot illustrating user interface(s) of the BUDACTZ. In FIG. 10, an exemplary user interface 1001 (e.g., for a mobile device, for a website) for registering a set of partner zone resources for backup protection is illustrated. As shown at 1010, a user may select which partner zone resources (e.g., virtual machines and/or disks) to register for backup protection. The user may utilize widget 1020 to select whether to enable screenshot verification for the selected partner zone resources. The user may utilize widget 1030 to deploy the backup protection (e.g., to provide resource backup registration input).

Additional Alternative Embodiment Examples

The following alternative example embodiments provide a number of variations of some of the already discussed principles for expanded color on the abilities of the BUDACTZ.

Additional embodiments may include:
1. An inter-trust-zone data transfer apparatus, comprising:
at least one memory;
a component collection stored in the at least one memory;
at least one processor disposed in communication with the at least one memory, the at least one processor executing processor-executable instructions from the component collection, the component collection storage structured with processor-executable instructions, comprising:
  obtain, via the at least one processor, a resource backup registration datastructure, in which the resource backup registration datastructure is structured to specify a partner shared cloud protected zone in a shared cloud of a third-party provider;
  obtain, via the at least one processor, a partner zone administrator authorization token datastructure associated with the partner shared cloud protected zone;
  create, via the at least one processor, a partner zone service account for the partner shared cloud protected zone using the partner zone administrator authorization token datastructure;
  determine, via the at least one processor, a partner zone resource in the partner shared cloud protected zone to be serviced;
  determine, via the at least one processor, a shared cloud backup zone in the shared cloud associated with the partner shared cloud protected zone;
  create, via the at least one processor, a corresponding backup resource in the shared cloud backup zone for the partner zone resource;
  generate, via the at least one processor, a service agent installation token datastructure for the partner zone resource, in which the service agent installation token datastructure is structured to associate the partner zone resource and the corresponding backup resource in the shared cloud backup zone; and
  install, via the at least one processor, a service agent on the partner zone resource using the partner zone service account and the service agent installation token datastructure, in which the service agent is structured to periodically send backup data associated with the partner zone resource from the partner shared cloud protected zone to the corresponding backup resource in the shared cloud backup zone.
2. The apparatus of embodiment 1, in which the resource backup registration datastructure is structured to specify a cloud region associated with the partner shared cloud protected zone in the shared cloud, and in which the shared cloud backup zone is located in the cloud region.
3. The apparatus of embodiment 1, in which the partner zone administrator authorization token datastructure is obtained from an authorization server associated with the shared cloud using OAuth framework.
4. The apparatus of embodiment 1, in which the instructions to create the partner zone service account are structured to specify a set of permissions to be granted to the partner zone service account.
5. The apparatus of embodiment 1, in which the partner zone resource is a virtual machine.
6. The apparatus of embodiment 1, in which the instructions to determine the partner zone resource to be serviced are structured as instructions to:
  obtain, via the at least one processor, a partner zone resources list datastructure that specifies a set of partner zone resources in the partner shared cloud protected zone from the shared cloud;
   generate, via at least one processor, a set of partner zone resource selection interaction-interface mechanisms, each partner zone resource selection interaction-interface mechanism in the set of partner zone resource selection interaction-interface mechanisms structured to be associated with a partner zone resource from the set of partner zone resources; and
   obtain, via at least one processor, a user selection of the partner zone resource to be serviced via a corresponding partner zone resource selection interaction-interface mechanism in the set of partner zone resource selection interaction-interface mechanisms.

7. The apparatus of embodiment 1, in which the corresponding backup resource is a virtual machine.

8. The apparatus of embodiment 1, in which the component collection storage is further structured with processor-executable instructions, comprising:
   perform, via the at least one processor, an integrity check to verify that backup data is not sent from the service agent to the corresponding backup resource cross-region.

9. The apparatus of embodiment 1, in which the component collection storage is further structured with processor-executable instructions, comprising:
   obtain, via the at least one processor, in the shared cloud backup zone, periodic backup data associated with the partner zone resource from the service agent;
   store, via the at least one processor, the periodic backup data on the corresponding backup resource; and
   send, via the at least one processor, the periodic backup data to a backup datacenter, in which the backup datacenter is structured as an external cloud distinct from the shared cloud.

10. The apparatus of embodiment 9, in which the external cloud is structured as a private cloud.

11. The apparatus of embodiment 9, in which the component collection storage is further structured with processor-executable instructions, comprising:
   verify, via the at least one processor, the periodic backup data using screenshot verification.

12. The apparatus of embodiment 11, in which the instructions to verify the periodic backup data using screenshot verification are structured as instructions to:
   obtain, via the at least one processor, a screenshot verification host from a fleet of multi-tenant hosts in the shared cloud backup zone;
   create, via the at least one processor, a mountpoint in the shared cloud backup zone for the periodic backup data;
   instruct, via the at least one processor, a zone hypervisor associated with the screenshot verification host to mount the mountpoint;
   instruct, via the at least one processor, the zone hypervisor associated with the screenshot verification host to boot a virtual machine associated with the mountpoint; and
   obtain, via the at least one processor, a verification screenshot from the zone hypervisor associated with the screenshot verification host, in which the verification screenshot comprises an image of the virtual machine's screen.

13. The apparatus of embodiment 12, in which the mountpoint is an iSCSI mountpoint.

14. The apparatus of embodiment 12, in which the zone hypervisor is structured to provide the verification screenshot after a specified boot time length has elapsed.

15. The apparatus of embodiment 12, in which the component collection storage is further structured with processor-executable instructions, comprising:
   perform, via the at least one processor, a set of context-sensitive tests against the verification screenshot to determine a pass or fail backup verification status for the periodic backup data.

16. An inter-trust-zone data transfer processor-readable, non-transient medium, the medium storing a component collection, the component collection storage structured with processor-executable instructions comprising:
   obtain, via the at least one processor, a resource backup registration datastructure, in which the resource backup registration datastructure is structured to specify a partner shared cloud protected zone in a shared cloud of a third-party provider;
   obtain, via the at least one processor, a partner zone administrator authorization token datastructure associated with the partner shared cloud protected zone;
   create, via the at least one processor, a partner zone service account for the partner shared cloud protected zone using the partner zone administrator authorization token datastructure;
   determine, via the at least one processor, a partner zone resource in the partner shared cloud protected zone to be serviced;
   determine, via the at least one processor, a shared cloud backup zone in the shared cloud associated with the partner shared cloud protected zone;
   create, via the at least one processor, a corresponding backup resource in the shared cloud backup zone for the partner zone resource;
   generate, via the at least one processor, a service agent installation token datastructure for the partner zone resource, in which the service agent installation token datastructure is structured to associate the partner zone resource and the corresponding backup resource in the shared cloud backup zone; and
   install, via the at least one processor, a service agent on the partner zone resource using the partner zone service account and the service agent installation token datastructure, in which the service agent is structured to periodically send backup data associated with the partner zone resource from the partner shared cloud protected zone to the corresponding backup resource in the shared cloud backup zone.

17. The medium of embodiment 16, in which the resource backup registration datastructure is structured to specify a cloud region associated with the partner shared cloud protected zone in the shared cloud, and in which the shared cloud backup zone is located in the cloud region.

18. The medium of embodiment 16, in which the partner zone administrator authorization token datastructure is obtained from an authorization server associated with the shared cloud using OAuth framework.

19. The medium of embodiment 16, in which the instructions to create the partner zone service account are structured to specify a set of permissions to be granted to the partner zone service account.

20. The medium of embodiment 16, in which the partner zone resource is a virtual machine.

21. The medium of embodiment 16, in which the instructions to determine the partner zone resource to be serviced are structured as instructions to:
  obtain, via the at least one processor, a partner zone resources list datastructure that specifies a set of partner zone resources in the partner shared cloud protected zone from the shared cloud;
  generate, via at least one processor, a set of partner zone resource selection interaction-interface mechanisms, each partner zone resource selection interaction-interface mechanism in the set of partner zone resource selection interaction-interface mechanisms structured to be associated with a partner zone resource from the set of partner zone resources; and
  obtain, via at least one processor, a user selection of the partner zone resource to be serviced via a corresponding partner zone resource selection interaction-interface mechanism in the set of partner zone resource selection interaction-interface mechanisms.

22. The medium of embodiment 16, in which the corresponding backup resource is a virtual machine.

23. The medium of embodiment 16, in which the component collection storage is further structured with processor-executable instructions, comprising:
  perform, via the at least one processor, an integrity check to verify that backup data is not sent from the service agent to the corresponding backup resource cross-region.

24. The medium of embodiment 16, in which the component collection storage is further structured with processor-executable instructions, comprising:
  obtain, via the at least one processor, in the shared cloud backup zone, periodic backup data associated with the partner zone resource from the service agent;
  store, via the at least one processor, the periodic backup data on the corresponding backup resource; and
  send, via the at least one processor, the periodic backup data to a backup datacenter, in which the backup datacenter is structured as an external cloud distinct from the shared cloud.

25. The medium of embodiment 24, in which the external cloud is structured as a private cloud.

26. The medium of embodiment 24, in which the component collection storage is further structured with processor-executable instructions, comprising:
  verify, via the at least one processor, the periodic backup data using screenshot verification.

27. The medium of embodiment 26, in which the instructions to verify the periodic backup data using screenshot verification are structured as instructions to:
  obtain, via the at least one processor, a screenshot verification host from a fleet of multi-tenant hosts in the shared cloud backup zone;
  create, via the at least one processor, a mountpoint in the shared cloud backup zone for the periodic backup data;
  instruct, via the at least one processor, a zone hypervisor associated with the screenshot verification host to mount the mountpoint;
  instruct, via the at least one processor, the zone hypervisor associated with the screenshot verification host to boot a virtual machine associated with the mountpoint; and
  obtain, via the at least one processor, a verification screenshot from the zone hypervisor associated with the screenshot verification host, in which the verification screenshot comprises an image of the virtual machine's screen.

28. The medium of embodiment 27, in which the mountpoint is an iSCSI mountpoint.

29. The medium of embodiment 27, in which the zone hypervisor is structured to provide the verification screenshot after a specified boot time length has elapsed.

30. The medium of embodiment 27, in which the component collection storage is further structured with processor-executable instructions, comprising:
  perform, via the at least one processor, a set of context-sensitive tests against the verification screenshot to determine a pass or fail backup verification status for the periodic backup data.

31. An inter-trust-zone data transfer processor-implemented system, comprising:
  means to store a component collection;
  means to process processor-executable instructions from the component collection, the component collection storage structured with processor-executable instructions including:
  obtain, via the at least one processor, a resource backup registration datastructure, in which the resource backup registration datastructure is structured to specify a partner shared cloud protected zone in a shared cloud of a third-party provider;
  obtain, via the at least one processor, a partner zone administrator authorization token datastructure associated with the partner shared cloud protected zone;
  create, via the at least one processor, a partner zone service account for the partner shared cloud protected zone using the partner zone administrator authorization token datastructure;
  determine, via the at least one processor, a partner zone resource in the partner shared cloud protected zone to be serviced;
  determine, via the at least one processor, a shared cloud backup zone in the shared cloud associated with the partner shared cloud protected zone;
  create, via the at least one processor, a corresponding backup resource in the shared cloud backup zone for the partner zone resource;
  generate, via the at least one processor, a service agent installation token datastructure for the partner zone resource, in which the service agent installation token datastructure is structured to associate the partner zone resource and the corresponding backup resource in the shared cloud backup zone; and
  install, via the at least one processor, a service agent on the partner zone resource using the partner zone service account and the service agent installation token datastructure, in which the service agent is structured to periodically send backup data associated with the partner zone resource from the partner shared cloud protected zone to the corresponding backup resource in the shared cloud backup zone.

32. The system of embodiment 31, in which the resource backup registration datastructure is structured to specify a cloud region associated with the partner shared cloud protected zone in the shared cloud, and in which the shared cloud backup zone is located in the cloud region.

33. The system of embodiment 31, in which the partner zone administrator authorization token datastructure is obtained from an authorization server associated with the shared cloud using OAuth framework.

34. The system of embodiment 31, in which the instructions to create the partner zone service account are structured to specify a set of permissions to be granted to the partner zone service account.

35. The system of embodiment 31, in which the partner zone resource is a virtual machine.

36. The system of embodiment 31, in which the instructions to determine the partner zone resource to be serviced are structured as instructions to:
    obtain, via the at least one processor, a partner zone resources list datastructure that specifies a set of partner zone resources in the partner shared cloud protected zone from the shared cloud;
    generate, via at least one processor, a set of partner zone resource selection interaction-interface mechanisms, each partner zone resource selection interaction-interface mechanism in the set of partner zone resource selection interaction-interface mechanisms structured to be associated with a partner zone resource from the set of partner zone resources; and
    obtain, via at least one processor, a user selection of the partner zone resource to be serviced via a corresponding partner zone resource selection interaction-interface mechanism in the set of partner zone resource selection interaction-interface mechanisms.

37. The system of embodiment 31, in which the corresponding backup resource is a virtual machine.

38. The system of embodiment 31, in which the component collection storage is further structured with processor-executable instructions, comprising:
    perform, via the at least one processor, an integrity check to verify that backup data is not sent from the service agent to the corresponding backup resource cross-region.

39. The system of embodiment 31, in which the component collection storage is further structured with processor-executable instructions, comprising:
    obtain, via the at least one processor, in the shared cloud backup zone, periodic backup data associated with the partner zone resource from the service agent;
    store, via the at least one processor, the periodic backup data on the corresponding backup resource; and
    send, via the at least one processor, the periodic backup data to a backup datacenter, in which the backup datacenter is structured as an external cloud distinct from the shared cloud.

40. The system of embodiment 39, in which the external cloud is structured as a private cloud.

41. The system of embodiment 39, in which the component collection storage is further structured with processor-executable instructions, comprising:
    verify, via the at least one processor, the periodic backup data using screenshot verification.

42. The system of embodiment 41, in which the instructions to verify the periodic backup data using screenshot verification are structured as instructions to:
    obtain, via the at least one processor, a screenshot verification host from a fleet of multi-tenant hosts in the shared cloud backup zone;
    create, via the at least one processor, a mountpoint in the shared cloud backup zone for the periodic backup data;
    instruct, via the at least one processor, a zone hypervisor associated with the screenshot verification host to mount the mountpoint;
    instruct, via the at least one processor, the zone hypervisor associated with the screenshot verification host to boot a virtual machine associated with the mountpoint; and
    obtain, via the at least one processor, a verification screenshot from the zone hypervisor associated with the screenshot verification host, in which the verification screenshot comprises an image of the virtual machine's screen.

43. The system of embodiment 42, in which the mountpoint is an iSCSI mountpoint.

44. The system of embodiment 42, in which the zone hypervisor is structured to provide the verification screenshot after a specified boot time length has elapsed.

45. The system of embodiment 42, in which the component collection storage is further structured with processor-executable instructions, comprising:
    perform, via the at least one processor, a set of context-sensitive tests against the verification screenshot to determine a pass or fail backup verification status for the periodic backup data.

46. An inter-trust-zone data transfer processor-implemented process, including processing processor-executable instructions via at least one processor from a component collection stored in at least one memory, the component collection storage structured with processor-executable instructions comprising:
    obtain, via the at least one processor, a resource backup registration datastructure, in which the resource backup registration datastructure is structured to specify a partner shared cloud protected zone in a shared cloud of a third-party provider;
    obtain, via the at least one processor, a partner zone administrator authorization token datastructure associated with the partner shared cloud protected zone;
    create, via the at least one processor, a partner zone service account for the partner shared cloud protected zone using the partner zone administrator authorization token datastructure;
    determine, via the at least one processor, a partner zone resource in the partner shared cloud protected zone to be serviced;
    determine, via the at least one processor, a shared cloud backup zone in the shared cloud associated with the partner shared cloud protected zone;
    create, via the at least one processor, a corresponding backup resource in the shared cloud backup zone for the partner zone resource;
    generate, via the at least one processor, a service agent installation token datastructure for the partner zone resource, in which the service agent installation token datastructure is structured to associate the partner zone resource and the corresponding backup resource in the shared cloud backup zone; and
    install, via the at least one processor, a service agent on the partner zone resource using the partner zone service account and the service agent installation token datastructure, in which the service agent is structured to periodically send backup data associated with the partner zone resource from the partner shared cloud protected zone to the corresponding backup resource in the shared cloud backup zone.

47. The process of embodiment 46, in which the resource backup registration datastructure is structured to specify a cloud region associated with the partner shared cloud protected zone in the shared cloud, and in which the shared cloud backup zone is located in the cloud region.
48. The process of embodiment 46, in which the partner zone administrator authorization token datastructure is obtained from an authorization server associated with the shared cloud using OAuth framework.
49. The process of embodiment 46, in which the instructions to create the partner zone service account are structured to specify a set of permissions to be granted to the partner zone service account.
50. The process of embodiment 46, in which the partner zone resource is a virtual machine.
51. The process of embodiment 46, in which the instructions to determine the partner zone resource to be serviced are structured as instructions to:
    obtain, via the at least one processor, a partner zone resources list datastructure that specifies a set of partner zone resources in the partner shared cloud protected zone from the shared cloud;
    generate, via at least one processor, a set of partner zone resource selection interaction-interface mechanisms, each partner zone resource selection interaction-interface mechanism in the set of partner zone resource selection interaction-interface mechanisms structured to be associated with a partner zone resource from the set of partner zone resources;
    and obtain, via at least one processor, a user selection of the partner zone resource to be serviced via a corresponding partner zone resource selection interaction-interface mechanism in the set of partner zone resource selection interaction-interface mechanisms.
52. The process of embodiment 46, in which the corresponding backup resource is a virtual machine.
53. The process of embodiment 46, in which the component collection storage is further structured with processor-executable instructions, comprising:
    perform, via the at least one processor, an integrity check to verify that backup data is not sent from the service agent to the corresponding backup resource cross-region.
54. The process of embodiment 46, in which the component collection storage is further structured with processor-executable instructions, comprising:
    obtain, via the at least one processor, in the shared cloud backup zone, periodic backup data associated with the partner zone resource from the service agent;
    store, via the at least one processor, the periodic backup data on the corresponding backup resource; and
    send, via the at least one processor, the periodic backup data to a backup datacenter, in which the backup datacenter is structured as an external cloud distinct from the shared cloud.
55. The process of embodiment 54, in which the external cloud is structured as a private cloud.
56. The process of embodiment 54, in which the component collection storage is further structured with processor-executable instructions, comprising:
    verify, via the at least one processor, the periodic backup data using screenshot verification.
57. The process of embodiment 56, in which the instructions to verify the periodic backup data using screenshot verification are structured as instructions to:
    obtain, via the at least one processor, a screenshot verification host from a fleet of multi-tenant hosts in the shared cloud backup zone;
    create, via the at least one processor, a mountpoint in the shared cloud backup zone for the periodic backup data;
    instruct, via the at least one processor, a zone hypervisor associated with the screenshot verification host to mount the mountpoint;
    instruct, via the at least one processor, the zone hypervisor associated with the screenshot verification host to boot a virtual machine associated with the mountpoint; and
    obtain, via the at least one processor, a verification screenshot from the zone hypervisor associated with the screenshot verification host, in which the verification screenshot comprises an image of the virtual machine's screen.
58. The process of embodiment 57, in which the mountpoint is an iSCSI mountpoint.
59. The process of embodiment 57, in which the zone hypervisor is structured to provide the verification screenshot after a specified boot time length has elapsed.
60. The process of embodiment 57, in which the component collection storage is further structured with processor-executable instructions, comprising:
    perform, via the at least one processor, a set of context-sensitive tests against the verification screenshot to determine a pass or fail backup verification status for the periodic backup data.
91. A trust-zone data transfer mechanism, comprising:
any of: an trust-zone data transfer apparatus, an trust-zone data transfer medium, an trust-zone data transfer system, and an trust-zone data transfer process;
    in which the trust-zone data transfer apparatus includes:
        at least one memory;
        a component collection stored in the at least one memory;
        at least one processor disposed in communication with the at least one memory, the at least one processor executing processor-executable instructions from the component collection;
    in which the trust-zone data transfer medium includes:
        processor-readable, non-transient medium, the medium storing a component collection;
    in which the trust-zone data transfer system includes:
        means to store a component collection;
        means to process processor-executable instructions from the component collection;
    in which the trust-zone data transfer process includes:
        processing processor-executable instructions via at least one processor from a component collection stored in at least one memory;
in which a component collection storage is structured with processor-executable instructions comprising:
    obtain, via at least one processor, a backup service trust zone authorization token request datastructure;
    provide a trust zone service account creation request datastructure to a third-party service provider;
    provide a trust zone service account permissions grant datastructure to the third-party service provider for the created service account;
    provide a trust zone service account protected potential resource list datastructure to the third-party service provider for the created service account and granted account permissions;

provide a trust zone service account storage creation request datastructure to the third-party service provider, subject to the permissions grant and potential resource list;

provide a trust zone resource install agent to the third-party service provider for the created service account, granted account permissions, and created account storage;

provide the resource install agent an instantiation instruction datastructure;

obtain trust zone account storage backup data from the third-party service provider's instantiated resource install agent.

92. The mechanism of embodiment 91, in which the instantiated resource install agent provides screenshots of any of: authorization access to any of the third-party service provider; back up of data to the third-party service provider created account storage, back up of data from the third-party service provider created account storage.

BUDACTZ Controller

FIG. 11 shows a block diagram illustrating non-limiting, example embodiments of a BUDACTZ controller. In this embodiment, the BUDACTZ controller 1101 may serve to aggregate, process, store, search, serve, identify, instruct, generate, match, and/or facilitate interactions with a computer through backup systems technologies, and/or other related data.

Users, which may be people and/or other systems, may engage information technology systems (e.g., computers) to facilitate information processing. In turn, computers employ processors to process information; such processors 1103 may be referred to as central processing units (CPU). One form of processor is referred to as a microprocessor. CPUs use communicative circuits to pass binary encoded signals acting as instructions to allow various operations. These instructions may be operational and/or data instructions containing and/or referencing other instructions and data in various processor accessible and operable areas of memory 1129 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the BUDACTZ controller 1101 may be connected to and/or communicate with entities such as, but not limited to: one or more users from peripheral devices 1112 (e.g., user input devices 1111); an optional cryptographic processor device 1128; and/or a communications network 1113.

Networks comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is referred to as a "node." Networks are generally thought to facilitate the transfer of information from source points to destinations. A node specifically tasked with furthering the passage of information from a source to a destination is called a "router." There are many forms of networks such as Local Area Networks (LANs), Pico networks, Wide Area Networks (WANs), Wireless Networks (WLANs), etc. For example, the Internet is, generally, an interconnection of a multitude of networks whereby remote clients and servers may access and interoperate with one another.

The BUDACTZ controller 1101 may be based on computer systems that may comprise, but are not limited to, components such as: a computer systemization 1102 connected to memory 1129.

Computer Systemization

A computer systemization 1102 may comprise a clock 1130, central processing unit ("CPU(s)" and/or "processor(s)" (these terms are used interchangeably throughout the disclosure unless noted to the contrary)) 1103, a memory 1129 (e.g., a read only memory (ROM) 1106, a random access memory (RAM) 1105, etc.), and/or an interface bus 1107, and most frequently, although not necessarily, are all interconnected and/or communicating through a system bus 1104 on one or more (mother)board(s) 1102 having conductive and/or otherwise transportive circuit pathways through which instructions (e.g., binary encoded signals) may travel to effectuate communications, operations, storage, etc. The computer systemization may be connected to a power source 1186; e.g., optionally the power source may be internal. Optionally, a cryptographic processor 1126 may be connected to the system bus. In another embodiment, the cryptographic processor, transceivers (e.g., ICs) 1174, and/or sensor array (e.g., accelerometer, altimeter, ambient light, barometer, global positioning system (GPS) (thereby allowing BUDACTZ controller to determine its location), gyroscope, magnetometer, pedometer, proximity, ultra-violet sensor, etc.) 1173 may be connected as either internal and/or external peripheral devices 1112 via the interface bus I/O 1108 (not pictured) and/or directly via the interface bus 1107. In turn, the transceivers may be connected to antenna(s) 1175, thereby effectuating wireless transmission and reception of various communication and/or sensor protocols; for example the antenna(s) may connect to various transceiver chipsets (depending on deployment needs), including: Broadcom® BCM4329FKUBG transceiver chip (e.g., providing 802.11n, Bluetooth 2.1+EDR, FM, etc.); a Broadcom® BCM4752 GPS receiver with accelerometer, altimeter, GPS, gyroscope, magnetometer; a Broadcom® BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom® BCM43341 transceiver chip (e.g., providing 2G, 3G and 4G LTE cellular communications; 802.11g/, Bluetooth 4.0, near field communication (NFC), FM radio); an Infineon Technologies® X-Gold 618-PMB9800 transceiver chip (e.g., providing 2G/3G HSDPA/HSUPA communications); a MediaTek® MT6620 transceiver chip (e.g., providing 802.11a/ac/b/g/n (also known as WiFi in numerous iterations), Bluetooth 4.0 LE, FM, GPS; a Lapis Semiconductor® ML8511 UV sensor; a maxim integrated MAX44000 ambient light and infrared proximity sensor; a Texas Instruments® WiLink WL1283 transceiver chip (e.g., providing 802.11n, Bluetooth 3.0, FM, GPS); and/or the like. The system clock may have a crystal oscillator and generates a base signal through the computer systemization's circuit pathways. The dock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks®), netbooks, tablets (e.g., Android®, iPads®, and Windows® tablets, etc.), mobile smartphones (e.g., Android®, iPhones®, Nokia®, Palm® and Windows® phones, etc.), wearable device(s) (e.g., headsets (e.g., Apple AirPods (Pro)®, glasses, goggles (e.g., Google Glass®), watches, etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1129 beyond the processor itself; internal memory may include, but is not limited to: fast registers, various levels of cache memory (e.g., level 1, 2, 3, etc.), (dynamic/static) RAM, solid state memory, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon®, Duron® and/or Opteron®; Apple's® A series of processors (e.g., A5, A6, A7, A8, etc.); ARM's® application, embedded and secure processors; IBM® and/or Motorola's DragonBall® and PowerPC®; IBM's® and Sony's® Cell processor; Intel's®80X86 series (e.g., 80386, 80486), Pentium®, Celeron®, Core (2) Duo®, i series (e.g., i3, i5, i7, i9, etc.), Itanium®, Xeon®, and/or XScale®; Motorola's® 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code), e.g., via load/read address commands; e.g., the CPU may read processor issuable instructions from memory (e.g., reading it from a component collection (e.g., an interpreted and/or compiled program application/library including allowing the processor to execute instructions from the application/library) stored in the memory). Such instruction passing facilitates communication within the BUDACTZ controller and beyond through various interfaces. Should processing requirements dictate a greater amount speed and/or capacity, distributed processors (e.g., see Distributed BUDACTZ below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the BUDACTZ may be achieved by implementing a microcontroller such as CAST's® R8051XC2 microcontroller; Diligent's® Basys 3 Artix-7, Nexys A7-100T, U192015125IT, etc.; Intel's® MCS 51 (i.e., 8051 microcontroller); and/or the like. Also, to implement certain features of the BUDACTZ, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the BUDACTZ component collection (distributed or otherwise) and/or features may be implemented via the microprocessor and/or via embedded components; e.g., via ASIC, coprocessor, DSP, FPGA, and/or the like. Alternately, some implementations of the BUDACTZ may be implemented with embedded components that are configured and used to achieve a variety of features or signal processing.

Depending on the particular implementation, the embedded components may include software solutions, hardware solutions, and/or some combination of both hardware/software solutions. For example, BUDACTZ features discussed herein may be achieved through implementing FPGAs, which are a semiconductor devices containing programmable logic components called "logic blocks", and programmable interconnects, such as the high performance FPGA Virtex® series and/or the low cost Spartan® series manufactured by Xilinx®. Logic blocks and interconnects can be programmed by the customer or designer, after the FPGA is manufactured, to implement any of the BUDACTZ features. A hierarchy of programmable interconnects allow logic blocks to be interconnected as needed by the BUDACTZ system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the BUDACTZ may be developed on FPGAs and then migrated into a fixed version that more resembles ASIC implementations. Alternate or coordinating implementations may migrate BUDACTZ controller features to a final ASIC instead of or in addition to FPGAs. Depending on the implementation all of the aforementioned embedded components and microprocessors may be considered the "CPU" and/or "processor" for the BUDACTZ.

Power Source

The power source 1186 may be of any various form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1186 is connected to at least one of the interconnected subsequent components of the BUDACTZ thereby providing an electric current to all subsequent components. In one example, the power source 1186 is connected to the system bus component 1104. In an alternative embodiment, an outside power source 1186 is provided through a connection across the I/O 1108 interface. For example, Ethernet (with power on Ethernet), IEEE 1394, USB and/or the like connections carry both data and power across the connection and is therefore a suitable source of power.

Interface Adapters

Interface bus(ses) 1107 may accept, connect, and/or communicate to a number of interface adapters, variously although not necessarily in the form of adapter cards, such as but not limited to: input output interfaces (I/O) 1108, storage interfaces 1109, network interfaces 1110, and/or the like. Optionally, cryptographic processor interfaces 1127 similarly may be connected to the interface bus. The interface bus provides for the communications of interface adapters with one another as well as with other components of the computer systemization. Interface adapters are adapted for a compatible interface bus. Interface adapters variously connect to the interface bus via a slot architecture. Various slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1109 may accept, communicate, and/or connect to a number of storage devices such as, but not limited to: (removable) storage devices 1114, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Non-Volatile Memory (NVM) Express (NVMe), Small Computer Systems Interface (SCSI), Thunderbolt, Universal Serial Bus (USB), and/or the like.

Network interfaces 1110 may accept, communicate, and/or connect to a communications network 1113. Through a communications network 1113, the BUDACTZ controller is accessible through remote clients 1133*b* (e.g., computers with web browsers) by users 1133*a*. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed BUDACTZ below), architectures may similarly be employed to pool, load balance, and/or otherwise decrease/increase the communicative bandwidth required by the BUDACTZ controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 1110 may be used to engage with various communications network types 1113. For example, multiple network interfaces may be employed to allow for the communication over broadcast, multicast, and/or unicast networks.

Input Output interfaces (I/O) 1108 may accept, communicate, and/or connect to user, peripheral devices 1112 (e.g., input devices 1111), cryptographic processor devices 1128, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, Thunderbolt/USB-C, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may include a video display, which may comprise a Cathode Ray Tube (CRT), Liquid Crystal Display (LCD), Light-Emitting Diode (LED), Organic Light-Emitting Diode (OLED), and/or the like based monitor with an interface (e.g., HDMI circuitry and cable) that accepts signals from a video interface, may be used. The video interface composites information generated by a computer systemization and generates video signals based on the composited information in a video memory frame. Another output device is a television set, which accepts signals from a video interface. The video interface provides the composited video information through a video connection interface that accepts a video display interface (e.g., an RCA composite video connector accepting an RCA composite video cable; a DVI connector accepting a DVI display cable, etc.).

Peripheral devices 1112 may be connected and/or communicate to I/O and/or other facilities of the like such as network interfaces, storage interfaces, directly to the interface bus, system bus, the CPU, and/or the like. Peripheral devices may be external, internal and/or part of the BUDACTZ controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection ensuring secure transactions with a digital signature, as connection/format adaptors, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 1111 often are a type of peripheral device 512 (see above) and may include: accelerometers, cameras, card readers, dongles, finger print readers, gloves, graphics tablets, joysticks, keyboards, microphones, mouse (mice), remote controls, security/biometric devices (e.g., facial identifiers, fingerprint reader, iris reader, retina reader, etc.), styluses, touch screens (e.g., capacitive, resistive, etc.), trackballs, trackpads, watches, and/or the like.

It should be noted that although user input devices and peripheral devices may be employed, the BUDACTZ controller may be embodied as an embedded, dedicated, and/or monitor-less (i.e., headless) device, and access may be provided over a network interface connection.

Cryptographic units such as, but not limited to, microcontrollers, processors 1126, interfaces 1127, and/or devices 1128 may be attached, and/or communicate with the BUDACTZ controller. A MC68HC16 microcontroller, manufactured by Motorola, Inc.®, may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other specialized cryptographic processors include: Broadcom's® CryptoNetX and other Security Processors; nCipher's® nShield; SafeNet's® Luna PCI (e.g., 7100) series; Semaphore Communications'®40 MHz Roadrunner 184; Sun's® Cryptographic Accelerators (e.g., Accelerator 6000 PCIe Board, Accelerator 500 Daughtercard); Via Nano® Processor (e.g., L2100, L2200, U2400) line, which is capable of performing 500+MB/s of cryptographic instructions; VLSI Technology's® 33 MHz 6868; and/or the like.

Memory

Generally, any mechanization and/or embodiment allowing a processor to affect the storage and/or retrieval of information is regarded as memory 1129. The storing of information in memory may result in a physical alteration of the memory to have a different physical state that makes the memory a structure with a unique encoding of the memory stored therein. Often, memory is a fungible technology and resource, thus, any number of memory embodiments may be employed in lieu of or in concert with one another. It is to be understood that the BUDACTZ controller and/or a computer systemization may employ various forms of memory 1129. For example, a computer systemization may be configured to have the operation of on-chip CPU memory (e.g., registers), RAM, ROM, and any other storage devices performed by a paper punch tape or paper punch card mechanism; however, such an embodiment would result in an extremely slow rate of operation. In one configuration, memory 1129 will include ROM 1106, RAM 1105, and a storage device 1114. A storage device 1114 may be any various computer system storage. Storage devices may include: an array of devices (e.g., Redundant Array of Independent Disks (RAID)); a cache memory, a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; register memory (e.g., in a CPU), solid state memory devices (USB memory, solid state drives (SSD), etc.); other processor-readable storage mediums; and/or other devices of the like. Thus, a computer systemization generally employs and makes use of memory.

Component Collection

The memory 1129 may contain a collection of processor-executable application/library/program and/or database components (e.g., including processor-executable instructions) and/or data such as, but not limited to: operating system component(s) 1115 (operating system); information server component(s) 1116 (information server); user interface component(s) 1117 (user interface); Web browser component(s) 1118 (Web browser); database(s) 1119; mail server component(s) 1121; mail client component(s) 1122; cryptographic server component(s) 1120 (cryptographic server); machine learning component 1123; distributed immutable ledger component 1124; the BUDACTZ component(s) 1135 (e.g., which may include RBC, RBR, RBE, RRE 1141-1144, and/or the like components); and/or the like (i.e., collectively referred to throughout as a "component collection"). These components may be stored and accessed from the storage devices and/or from storage devices accessible through an interface bus. Although unconventional program components such as those in the component collection may be stored in a local storage device 1114, they may also be loaded and/or stored in memory such as: cache, peripheral devices, processor registers, RAM, remote storage facilities through a communications network, ROM, various forms of memory, and/or the like.

Opening System

The operating system component 1115 is an executable program component facilitating the operation of the BUDACTZ controller. The operating system may facilitate access of I/O, network interfaces, peripheral devices, storage devices, and/or the like. The operating system may be a highly fault tolerant, scalable, and secure system such as: Apple's Macintosh OS X (Server) and macOS®; AT&T Plan 9®; Be OS®; Blackberry's QNX®; Google's Chrome®; Microsoft's Windows® 7/8/10; Unix and Unix-like system distributions (such as AT&T's UNIX®; Berkley Software Distribution (BSD)® variations such as FreeBSD®, NetBSD, OpenBSD, and/or the like; Linux distributions such as Red Hat, Ubuntu, and/or the like); and/or the like operating systems. However, more limited and/or less secure operating systems also may be employed such as Apple Macintosh OS® (i.e., versions 1-9), IBM OS/2®, Microsoft DOS®, Microsoft Windows 2000/2003/3.1/95/98/CE/Millennium/Mobile/NT/Vista/XP/7/X (Server)®, Palm OS®, and/or the like. Additionally, for robust mobile deployment applications, mobile operating systems may be used, such as: Apple's iOS®; China Operating System COS®;

Google's Android®; Microsoft Windows RT/Phone®; Palm's WebOS®; Samsung/Intel's Tizen®; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may facilitate the interaction with communications networks, data, I/O, peripheral devices, program components, memory, user input devices, and/or the like. The operating system may provide communications protocols that allow the BUDACTZ controller to communicate with other entities through a communications network 1113. Various communication protocols may be used by the BUDACTZ controller as a subcarrier transport mechanism for interaction, such as, but not limited to: multicast, TCP/IP, UDP, unicast, and/or the like.

Information Server

An information server component 1116 is a stored program component that is executed by a CPU. The information server may be an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, Ruby, wireless application protocol (WAP), WebObjects®, and/or the like. The information server may support secure communications protocols such as, but not limited to, File Transfer Protocol (FTP(S)); HyperText Transfer Protocol (HTTP); Secure Hypertext Transfer Protocol (HTTPS), Secure Socket Layer (SSL) Transport Layer Security (TLS), messaging protocols (e.g., America Online (AOL) Instant Messenger (AIM)®, Application Exchange (APEX), ICQ, Internet Relay Chat (IRC), Microsoft Network (MSN) Messenger® Service, Presence and Instant Messaging Protocol (PRIM), Internet Engineering Task Force's® (IETF's) Session Initiation Protocol (SIP), SIP for Instant Messaging and Presence Leveraging Extensions (SIMPLE), Slack®, open XML-based Extensible Messaging and Presence Protocol (XMPP) (i.e., Jabber® or Open Mobile Alliance's (OMA's) Instant Messaging and Presence Service (IMPS)), Yahoo!Instant Messenger® Service, and/or the like). The information server may provide results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the BUDACTZ controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the BUDACTZ database 1119, operating systems, other program components, user interfaces, Web browsers, and/or the like.

Access to the BUDACTZ database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the BUDACTZ. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in SQL by instantiating a search string with the proper join/select commands based on the tagged text entries, and the resulting command is provided over the bridge mechanism to the BUDACTZ as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as buttons, check boxes, cursors, graphical views, menus, scrollers, text fields, and windows (collectively referred to as widgets) similarly facilitate the access, capabilities, operation, and display of data and computer hardware and operating system resources, and status. Operation interfaces are called user interfaces. Graphical user interfaces (GUIs) such as the Apple's iOS®, Macintosh Operating System's Aqua®; IBM's OS/2®; Google's Chrome® (e.g., and other webbrowser/cloud based client OSs); Microsoft's Windows® 2000/2003/3.1/95/98/CE/Millennium/Mobile/NT/Vista/XP/7/X (Server)® (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface®, and/or the like, any of which may be used and) provide a baseline and mechanism of accessing and displaying information graphically to users.

A user interface component 1117 is a stored program component that is executed by a CPU. The user interface may be a graphic user interface as provided by, with, and/or atop operating systems and/or operating environments, and may provide executable library APIs (as may operating systems and the numerous other components noted in the component collection) that allow instruction calls to generate user interface elements such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1118 is a stored program component that is executed by a CPU. The Web browser may be a hypertext viewing application such as Apple's (mobile) Safari®, Google's Chrome®, Microsoft Internet Explorer®, Mozilla's Firefox®, Netscape Navigator®, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox®, Safari® Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the BUDACTZ enabled nodes. The combined application may be nugatory on systems employing Web browsers.

Mail Server

A mail server component 1121 is a stored program component that is executed by a CPU 1103. The mail server may be an Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects®, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the BUDACTZ. Alternatively, the mail server component may be distributed out to mail service providing entities such as Google's® cloud services (e.g., Gmail and notifications may alternatively be provided via messenger services such as AOL's Instant Messenger®, Apple's iMessage®, Google Messenger®, SnapChat®, etc.).

Access to the BUDACTZ mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1122 is a stored program component that is executed by a CPU 1103. The mail client may be a mail viewing application such as Apple Mail®, Microsoft Entourage®, Microsoft Outlook®, Microsoft Outlook Express®, Mozilla®, Thunderbird®, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1120 is a stored program component that is executed by a CPU 1103, cryptographic processor 1126, cryptographic processor interface 1127, cryptographic processor device 1128, and/or the like. Cryptographic processor interfaces will allow for expedition of encryption and/or decryption requests by the cryptographic component; however, the cryptographic component, alternatively, may run on a CPU and/or GPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component facilitates numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the BUDACTZ may encrypt all incoming and/or outgoing communications and may serve as node within a virtual private network (VPN) with a wider communications network. The cryptographic component facilitates the process of "security authorization" whereby access to a resource is inhibited by a security protocol and the cryptographic component effects authorized access to the secured resource. In addition, the cryptographic component may provide unique identifiers of content, e.g., employing an MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to allow the BUDACTZ component to engage in secure transactions if so desired. The cryptographic component facilitates the secure accessing of resources on the BUDACTZ and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

Machine Learning (ML)

In one non limiting embodiment, the BUDACTZ includes a machine learning component 1123, which may be a stored program component that is executed by a CPU 1103. The machine learning component, alternatively, may run on a set of specialized processors, ASICs, FPGAs, GPUs, and/or the like. The machine learning component may be deployed to execute serially, in parallel, distributed, and/or the like, such as by utilizing cloud computing. The machine learning component may employ an ML platform such as Amazon SageMaker, Azure Machine Learning, DataRobot AI Cloud, Google AI Platform, IBM Watson® Studio, and/or the like. The machine learning component may be implemented using an ML framework such as PyTorch, Apache MXNet, MathWorks Deep Learning Toolbox, scikit-learn, TensorFlow, XGBoost, and/or the like. The machine learning component facilitates training and/or testing of ML prediction logic data structures (e.g., models) and/or utilizing ML prediction logic data structures (e.g., models) to output ML predictions by the BUDACTZ. The machine learning component may employ various artificial intelligence and/or learning mechanisms such as Reinforcement Learning, Supervised Learning, Unsupervised Learning, and/or the like. The machine learning component may employ ML prediction logic data structure (e.g., model) types such as Bayesian Networks, Classification prediction logic data structures (e.g., models), Decision Trees, Neural Networks (NNs), Regression prediction logic data structures (e.g., models), and/or the like.

Distributed Immutable Ledger (DIL)

In one non limiting embodiment, the BUDACTZ includes a distributed immutable ledger component 1124, which may be a stored program component that is executed by a CPU 1103. The distributed immutable ledger component, alternatively, may run on a set of specialized processors, ASICs, FPGAs, GPUs, and/or the like. The distributed immutable ledger component may be deployed to execute serially, in parallel, distributed, and/or the like, such as by utilizing a peer-to-peer network. The distributed immutable ledger component may be implemented as a blockchain (e.g., public blockchain, private blockchain, hybrid blockchain) that comprises cryptographically linked records (e.g., blocks). The distributed immutable ledger component may employ a platform such as Bitcoin, Bitcoin Cash, Dogecoin, Ethereum, Litecoin, Monero, Zcash, and/or the like. The distributed immutable ledger component may employ a consensus mechanism such as proof of authority, proof of space, proof of steak, proof of work, and/or the like. The distributed immutable ledger component may be used to provide functionality such as data storage, cryptocurrency, inventory tracking, non-fungible tokens (NFTs), smart contracts, and/or the like.

The BUDACTZ Database

The BUDACTZ database component 1119 may be embodied in a database and its stored data. The database is a stored program component, which is executed by the CPU; the stored program component portion configuring the CPU to process the stored data. The database may be a fault tolerant, relational, scalable, secure database such as Claris FileMaker®, MySQL®, Oracle®, Sybase®, etc. may be used. Additionally, optimized fast memory and distributed databases such as IBM's Netezza®, MongoDB's MongoDB®, opensource Hadoop®, opensource VoltDB, SAP's Hana®, etc. Relational databases are an extension of a flat file. Relational databases include a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the BUDACTZ database may be implemented using various other data-structures, such as an array, hash, (linked) list, struct, structured text file (e.g., XML), table, flat file database, and/or the like. Such data-structures may be stored in memory and/or in (structured) files. In another alternative, an object-oriented database may be used, such as Frontier™, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the BUDACTZ database is implemented as a data-structure, the use of the BUDACTZ database 1119 may be integrated into another component such as the BUDACTZ component 1135. Also, the database may be implemented as a mix of data structures, objects, programs, relational structures, scripts, and/or the like. Databases may be consolidated and/or distributed in countless variations (e.g., see Distributed BUDACTZ below). Portions of databases, e.g., tables, may be exported and/or imported and thus decentralized and/or integrated.

In another embodiment, the database component (and/or other storage mechanism of the BUDACTZ) may store data immutably so that tampering with the data becomes physically impossible and the fidelity and security of the data may be assured. In some embodiments, the database may be stored to write only or write once, read many (WORM) mediums. In another embodiment, the data may be stored on distributed ledger systems (e.g., via blockchain) so that any tampering to entries would be readily identifiable. In one embodiment, the database component may employ the distributed immutable ledger component DIL 1124 mechanism.

In one embodiment, the database component 1119 includes several tables representative of the schema, tables, structures, keys, entities and relationships of the described database 1119*a-k*:

- An accounts table 1119*a* includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;
- A users table 1119*b* includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a BUDACTZ);
- An devices table 1119*c* includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppInstalledFlag, deviceAccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power condition, temperature_setting, speed_adjust, hold_duration, part actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;
- An apps table 1119*d* includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;
- An assets table 1119*e* includes fields such as, but not limited to: assetID, accountID, userID, distributorAccountID, distributorPaymentID, distributorOnwerID, assetOwnerID, assetType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, assetSeriesSeason, assetSeriesEpisode, assetCode, assetQuantity, assetCost, assetPrice, assetValue, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, assetAPI, assetAPIconnectionAddress, and/or the like;
- A payments table 1119*f* includes fields such as, but not limited to: paymentID, accountID, userID, couponID, couponValue, couponConditions, couponExpiration, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;
- An transactions table 1119*g* includes fields such as, but not limited to: transactionID, accountID, assetIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;
- An merchants table 1119*h* includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, and/or the like;
- An ads table 1119*i* includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherIndustry, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like;

An ML table 1119j includes fields such as, but not limited to: MLID, predictionLogicStructureID, predictionLogicStructureType, predictionLogicStructureConfiguration, predictionLogicStructureTrainedStructure, predictionLogicStructureTrainingData, predictionLogicStructureTrainingDataConfiguration, predictionLogicStructureTestingData, predictionLogicStructureTestingDataConfiguration, predictionLogicStructureOutputData, predictionLogicStructureOutputDataConfiguration, and/or the like;

A resource backups table 1119k includes fields such as, but not limited to: backupID, associatedPartnerID, associatedPartnerZoneID, associatedResourceID, associatedBackupZoneID, associatedBackupResourceID, associatedCloudID, associatedCloudRegionID, backupResourceType, backupData, backupDateTime, backupVersion, backupType, backupScreenshotVerificationResult, and/or the like.

In one embodiment, the BUDACTZ database may interact with other database systems. For example, employing a distributed database system, queries and data access by search BUDACTZ component may treat the combination of the BUDACTZ database, an integrated data security layer database as a single database entity (e.g., see Distributed BUDACTZ below).

In one embodiment, user programs may contain various user interface primitives, which may serve to update the BUDACTZ. Also, various accounts may require custom database tables depending upon the environments and the types of clients the BUDACTZ may need to serve. It should be noted that any unique fields may be designated as a key field throughout In an alternative embodiment, these tables have been decentralized into their own databases and their respective database controllers (i.e., individual database controllers for each of the above tables). The BUDACTZ may also be configured to distribute the databases over several computer systemizations and/or storage devices. Similarly, configurations of the decentralized database controllers may be varied by consolidating and/or distributing the various database components 1119a-k. The BUDACTZ may be configured to keep track of various settings, inputs, and parameters via database controllers.

The BUDACTZ database may communicate to and/or with other components in a component collection, including itself, and/or facilities of the like. Most frequently, the BUDACTZ database communicates with the BUDACTZ component, other program components, and/or the like. The database may contain, retain, and provide information regarding other nodes and data.

The BUDACTZs

The BUDACTZ component 1135 is a stored program component that is executed by a CPU via stored instruction code configured to engage signals across conductive pathways of the CPU and ISICI controller components. In one embodiment, the BUDACTZ component incorporates any and/or all combinations of the aspects of the BUDACTZ that were discussed in the previous figures. As such, the BUDACTZ affects accessing, obtaining and the provision of information, services, transactions, and/or the like across various communications networks. The features and embodiments of the BUDACTZ discussed herein increase network efficiency by reducing data transfer requirements with the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the BUDACTZ's features and facilities, and in many cases reduce the costs, energy consumption/requirements, and extend the life of BUDACTZ's underlying infrastructure; this has the added benefit of making the BUDACTZ more reliable. Similarly, many of the features and mechanisms are designed to be easier for users to use and access, thereby broadening the audience that may enjoy/employ and exploit the feature sets of the BUDACTZ; such ease of use also helps to increase the reliability of the BUDACTZ. In addition, the feature sets include heightened security as noted via the Cryptographic components 1120, 1126, 1128 and throughout, making access to the features and data more reliable and secure The BUDACTZ transforms resource backup registration input, resource backup execution request, resource restore input datastructure/inputs, via BUDACTZ components (e.g., RBC, RBR, RBE, RRE), into resource backup registration output, resource backup execution response, resource restore output outputs.

The BUDACTZ component facilitates access of information between nodes may be developed by employing various development tools and languages such as, but not limited to: Apache® components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, Ruby, shell scripts, SQL commands, web application server extensions, web development environments and libraries (e.g., Microsoft's® ActiveX; Adobe® AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo!® User Interface; and/or the like), WebObjects®, and/or the like. In one embodiment, the BUDACTZ server employs a cryptographic server to encrypt and decrypt communications. The BUDACTZ component may communicate to and/or with other components in a component collection, including itself, and/or facilities of the like. Most frequently, the BUDACTZ component communicates with the BUDACTZ database, operating systems, other program components, and/or the like. The BUDACTZ may contain, communicate, generate, obtain, and/or provide program component, system, user, and/or data communications, requests, and/or responses.

Distributed BUDACTZs

The structure and/or operation of any of the BUDACTZ node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such, a combination of hardware may be distributed within a location, within a region and/or globally where logical access to a controller may be abstracted as a singular node, yet where a multitude of private, semiprivate and publicly accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access, etc.).

The component collection may be consolidated and/or distributed in countless variations through various data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so as discussed through the disclosure and/or through various other data processing communication techniques.

The configuration of the BUDACTZ controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services®, Microsoft Azure®, Hewlett Packard Helion®, IBM® Cloud services allow for BUDACTZ controller and/or BUDACTZ component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), NeXT Computer, Inc.'s (Dynamic) Object Linking, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as JSON, lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c -post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the BUDACTZ controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via an SSL connection, parse the data to extract variables, and store the data to a database, is provided below:

```
<?PHP
header ('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
```

-continued

```
$client = socket_accept($sock);
// read input data from client device in 1024 byte blocks until end of
message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:
http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm
and other parser implementations:
http://publib.boulder.ibm.com/infocenter/tivihelp/v2r1/index.jsp?topic=/com.ibm.IBMDI.doc/referenceguide259.htm
all of which are hereby expressly incorporated by reference.

In order to address various issues and advance the art, the entirety of this application for Back Up Data Across Cloud Trust Zone Apparatuses, Processes and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower", "upper", "horizontal", "vertical", "above", "below", "up", "down", "top" and "bottom" as well as derivatives thereof (e.g., "horizontally", "downwardly", "upwardly", etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached", "affixed", "connected", "coupled", "interconnected", etc. may refer to a relationship where structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, provisionals, re-issues, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a BUDACTZ individual and/or enterprise user, database configuration and/or relational model, data type, data transmission and/or network framework, library, syntax structure, and/or the like, various embodiments of the BUDACTZ, may be implemented that allow a great deal of flexibility and customization. For example, aspects of the BUDACTZ may be adapted for remote token based logins, virtual machine remote instantiation, virtual machine token-based instantiation and logins, etc. While various embodiments and discussions of the BUDACTZ have included backup systems, however, it is to be understood that the embodiments described herein may be readily configured and/or customized for a wide variety of other applications and/or implementations.

What is claimed is:
1. An inter-trust-zone data transfer apparatus, comprising:
at least one memory;
a component collection stored in the at least one memory;
at least one processor disposed in communication with the at least one memory, the at least one processor executing processor-executable instructions from the compo- nent collection, the component collection storage structured with processor-executable instructions, comprising:

obtain, via the at least one processor, a resource backup registration datastructure, in which the resource backup registration datastructure is structured to specify a partner shared cloud protected zone in a shared cloud of a third-party provider;

obtain, via the at least one processor, a partner zone administrator authorization token datastructure associated with the partner shared cloud protected zone;

create, via the at least one processor, a partner zone service account for the partner shared cloud protected zone using the partner zone administrator authorization token datastructure;

determine, via the at least one processor, a partner zone resource in the partner shared cloud protected zone to be serviced;

determine, via the at least one processor, a shared cloud backup zone in the shared cloud associated with the partner shared cloud protected zone;

create, via the at least one processor, a corresponding backup resource in the shared cloud backup zone for the partner zone resource;

generate, via the at least one processor, a service agent installation token datastructure for the partner zone resource, in which the service agent installation token datastructure is structured to associate the partner zone resource and the corresponding backup resource in the shared cloud backup zone; and install, via the at least one processor, a service agent on the partner zone resource using the partner zone service account and the service agent installation token datastructure, in which the service agent is structured to periodically send backup data associated with the partner zone resource from the partner shared cloud protected zone to the corresponding backup resource in the shared cloud backup zone.

2. The apparatus of claim 1, in which the resource backup registration datastructure is structured to specify a cloud region associated with the partner shared cloud protected zone in the shared cloud, and in which the shared cloud backup zone is located in the cloud region.

3. The apparatus of claim 1, in which the partner zone administrator authorization token datastructure is obtained from an authorization server associated with the shared cloud using OAuth framework.

4. The apparatus of claim 1, in which the instructions to create the partner zone service account are structured to specify a set of permissions to be granted to the partner zone service account.

5. The apparatus of claim 1, in which the partner zone resource is a virtual machine.

6. The apparatus of claim 1, in which the instructions to determine the partner zone resource to be serviced are structured as instructions to:

obtain, via the at least one processor, a partner zone resources list datastructure that specifies a set of partner zone resources in the partner shared cloud protected zone from the shared cloud;

generate, via at least one processor, a set of partner zone resource selection interaction-interface mechanisms, each partner zone resource selection interaction-interface mechanism in the set of partner zone resource selection interaction-interface mechanisms structured to be associated with a partner zone resource from the set of partner zone resources; and obtain, via at least one processor, a user selection of the partner zone resource to be serviced via a corresponding partner zone resource selection interaction-interface mechanism in the set of partner zone resource selection interaction-interface mechanisms.

7. The apparatus of claim 1, in which the corresponding backup resource is a virtual machine.

8. The apparatus of claim 1, in which the component collection storage is further structured with processor-executable instructions, comprising:

perform, via the at least one processor, an integrity check to verify that backup data is not sent from the service agent to the corresponding backup resource cross-region.

9. The apparatus of claim 1, in which the component collection storage is further structured with processor-executable instructions, comprising:

obtain, via the at least one processor, in the shared cloud backup zone, periodic backup data associated with the partner zone resource from the service agent;

store, via the at least one processor, the periodic backup data on the corresponding backup resource; and send, via the at least one processor, the periodic backup data to a backup datacenter, in which the backup datacenter is structured as an external cloud distinct from the shared cloud.

10. The apparatus of claim 9, in which the external cloud is structured as a private cloud.

11. The apparatus of claim 9, in which the component collection storage is further structured with processor-executable instructions, comprising:

verify, via the at least one processor, the periodic backup data using screenshot verification.

12. The apparatus of claim 11, in which the instructions to verify the periodic backup data using screenshot verification are structured as instructions to:

obtain, via the at least one processor, a screenshot verification host from a fleet of multi-tenant hosts in the shared cloud backup zone;

create, via the at least one processor, a mountpoint in the shared cloud backup zone for the periodic backup data;

instruct, via the at least one processor, a zone hypervisor associated with the screenshot verification host to mount the mountpoint;

instruct, via the at least one processor, the zone hypervisor associated with the screenshot verification host to boot a virtual machine associated with the mountpoint; and obtain, via the at least one processor, a verification screenshot from the zone hypervisor associated with the screenshot verification host, in which the verification screenshot comprises an image of the virtual machine's screen.

13. The apparatus of claim 12, in which the mountpoint is an iSCSI mountpoint.

14. The apparatus of claim 12, in which the zone hypervisor is structured to provide the verification screenshot after a specified boot time length has elapsed.

15. The apparatus of claim 12, in which the component collection storage is further structured with processor-executable instructions, comprising:

perform, via the at least one processor, a set of context-sensitive tests against the verification screenshot to determine a pass or fail backup verification status for the periodic backup data.

16. An inter-trust-zone data transfer processor-readable, non-transient medium, the medium storing a component collection, the component collection storage structured with processor-executable instructions comprising:

obtain, via the at least one processor, a resource backup registration datastructure, in which the resource backup registration datastructure is structured to specify a partner shared cloud protected zone in a shared cloud of a third-party provider;

obtain, via the at least one processor, a partner zone administrator authorization token datastructure associated with the partner shared cloud protected zone;

create, via the at least one processor, a partner zone service account for the partner shared cloud protected zone using the partner zone administrator authorization token datastructure;

determine, via the at least one processor, a partner zone resource in the partner shared cloud protected zone to be serviced;

determine, via the at least one processor, a shared cloud backup zone in the shared cloud associated with the partner shared cloud protected zone;

create, via the at least one processor, a corresponding backup resource in the shared cloud backup zone for the partner zone resource;

generate, via the at least one processor, a service agent installation token datastructure for the partner zone resource, in which the service agent installation token datastructure is structured to associate the partner zone resource and the corresponding backup resource in the shared cloud backup zone; and install, via the at least one processor, a service agent on the partner zone resource using the partner zone service account and the service agent installation token datastructure, in which the service agent is structured to periodically send backup data associated with the partner zone resource from the partner shared cloud protected zone to the corresponding backup resource in the shared cloud backup zone.

17. An inter-trust-zone data transfer processor-implemented system, comprising:

means to store a component collection;

means to process processor-executable instructions from the component collection, the component collection storage structured with processor-executable instructions including:

obtain, via the at least one processor, a resource backup registration datastructure, in which the resource backup registration datastructure is structured to specify a partner shared cloud protected zone in a shared cloud of a third-party provider;

obtain, via the at least one processor, a partner zone administrator authorization token datastructure associated with the partner shared cloud protected zone;

create, via the at least one processor, a partner zone service account for the partner shared cloud protected zone using the partner zone administrator authorization token datastructure;

determine, via the at least one processor, a partner zone resource in the partner shared cloud protected zone to be serviced;

determine, via the at least one processor, a shared cloud backup zone in the shared cloud associated with the partner shared cloud protected zone;

create, via the at least one processor, a corresponding backup resource in the shared cloud backup zone for the partner zone resource;

generate, via the at least one processor, a service agent installation token datastructure for the partner zone resource, in which the service agent installation token datastructure is structured to associate the partner zone resource and the corresponding backup resource in the shared cloud backup zone; and install, via the at least one processor, a service agent on the partner zone resource using the partner zone service account and the service agent installation token datastructure, in which the service agent is structured to periodically send backup data associated with the partner zone resource from the partner shared cloud protected zone to the corresponding backup resource in the shared cloud backup zone.

18. An inter-trust-zone data transfer processor-implemented process, including processing processor-executable instructions via at least one processor from a component collection stored in at least one memory, the component collection storage structured with processor-executable instructions comprising:

obtain, via the at least one processor, a resource backup registration datastructure, in which the resource backup registration datastructure is structured to specify a partner shared cloud protected zone in a shared cloud of a third-party provider;

obtain, via the at least one processor, a partner zone administrator authorization token datastructure associated with the partner shared cloud protected zone;

create, via the at least one processor, a partner zone service account for the partner shared cloud protected zone using the partner zone administrator authorization token datastructure;

determine, via the at least one processor, a partner zone resource in the partner shared cloud protected zone to be serviced;

determine, via the at least one processor, a shared cloud backup zone in the shared cloud associated with the partner shared cloud protected zone;

create, via the at least one processor, a corresponding backup resource in the shared cloud backup zone for the partner zone resource;

generate, via the at least one processor, a service agent installation token datastructure for the partner zone resource, in which the service agent installation token datastructure is structured to associate the partner zone resource and the corresponding backup resource in the shared cloud backup zone; and install, via the at least one processor, a service agent on the partner zone resource using the partner zone service account and the service agent installation token datastructure, in which the service agent is structured to periodically send backup data associated with the partner zone resource from the partner shared cloud protected zone to the corresponding backup resource in the shared cloud backup zone.

\* \* \* \* \*